US011551057B2

(12) United States Patent
George et al.

(10) Patent No.: US 11,551,057 B2
(45) Date of Patent: *Jan. 10, 2023

(54) SYSTEMS AND METHODS FOR GENERATING DATA EXPLANATIONS FOR NEURAL NETWORKS AND RELATED SYSTEMS

(71) Applicant: Intrinsic Innovation LLC, Mountain View, CA (US)

(72) Inventors: Dileep George, Sunnyvale, CA (US); Kenneth Alan Kansky, Union City, CA (US); Christopher Remmert Laan, San Francisco, CA (US); Wolfang Lehrach, Berkeley, CA (US); Bhaskara Mannar Marthi, Sunnyvale, CA (US); David Scott Phoenix, Berkeley, CA (US); Eric Purdy, Berkeley, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 893 days.

This patent is subject to a terminal disclaimer.

(21) Appl. No.: 16/298,932

(22) Filed: Mar. 11, 2019

(65) Prior Publication Data
US 2019/0205732 A1 Jul. 4, 2019

Related U.S. Application Data

(63) Continuation of application No. 14/822,730, filed on Aug. 10, 2015, now Pat. No. 10,275,705.
(Continued)

(51) Int. Cl.
*G06N 3/04* (2006.01)
*G06K 9/62* (2022.01)

(52) U.S. Cl.
CPC ......... *G06N 3/0445* (2013.01); *G06K 9/6272* (2013.01); *G06K 9/6278* (2013.01); *G06N 3/0472* (2013.01)

(58) Field of Classification Search
CPC ........ G06N 3/08; G06N 3/063; G06N 3/0445; G06N 3/0472; G06N 3/02; G06N 3/0454;
(Continued)

(56) References Cited

U.S. PATENT DOCUMENTS

| 5,065,040 | A | 11/1991 | Peterson et al. |
| 5,253,329 | A | 10/1993 | Villarreal et al. |
| 5,666,518 | A | 9/1997 | Jumper |
| 7,711,663 | B2 | 5/2010 | Weng |

(Continued)

FOREIGN PATENT DOCUMENTS

| JP | 1993040829 | 2/1993 |
| JP | 2000259597 | 9/2000 |

OTHER PUBLICATIONS

George, "How the Brain Might Work: A Hierarchical and Temporal Model for Learning and Recognition", Dissertation, 2008. (Year: 2008).*

(Continued)

*Primary Examiner* — Dave Misir
(74) *Attorney, Agent, or Firm* — Fish & Richardson P.C.

(57) ABSTRACT

A method for generating data explanations in a recursive cortical network includes receiving a set of evidence data at child feature nodes of a first layer of the recursive cortical network, setting a transformation configuration that directs messaging of evidence data and transformed data between layers of the network, performing a series of transformations on the evidence data according to the transformation configuration, the series including at least one forward trans-
(Continued)

formation and at least one reverse transformation, and outputting the transformed evidence data.

22 Claims, 15 Drawing Sheets

Related U.S. Application Data

(60) Provisional application No. 62/035,039, filed on Aug. 8, 2014.
(58) Field of Classification Search
CPC ............... G06K 9/6272; G06K 9/6278; G05B 2219/21002; G06V 10/82
USPC .......................................................... 706/20
See application file for complete search history.

(56) References Cited

U.S. PATENT DOCUMENTS

| | | | |
|---|---|---|---|
| 7,720,779 B1 | 5/2010 | Perry et al. | |
| 7,739,208 B2 | 6/2010 | George et al. | |
| 8,103,603 B2 | 1/2012 | George et al. | |
| 8,200,025 B2 | 6/2012 | Woodbeck | |
| 8,290,886 B2 | 10/2012 | George et al. | |
| 8,332,339 B2 | 12/2012 | Nugent | |
| 8,340,435 B2 | 12/2012 | Duong et al. | |
| 8,369,652 B1 | 2/2013 | Khosla et al. | |
| 8,442,321 B1 | 5/2013 | Chang et al. | |
| 8,798,375 B1 | 8/2014 | Chang et al. | |
| 9,053,431 B1* | 6/2015 | Commons | G10L 15/16 |
| 9,262,698 B1 | 2/2016 | George et al. | |
| 2005/0114280 A1 | 5/2005 | Rising | |
| 2005/0265629 A1 | 12/2005 | Fu et al. | |
| 2007/0192270 A1* | 8/2007 | Hawkins | G06N 3/049 706/52 |
| 2008/0154815 A1 | 6/2008 | Martinez | |
| 2009/0006289 A1* | 1/2009 | Jaros | G06N 3/049 706/12 |
| 2009/0299929 A1 | 12/2009 | Kozma et al. | |
| 2011/0064327 A1* | 3/2011 | Dagher | G06T 5/50 382/284 |
| 2012/0005134 A1* | 1/2012 | Jaros | G06N 3/049 706/12 |
| 2012/0109857 A1* | 5/2012 | George | G06N 3/08 706/10 |
| 2013/0117212 A1 | 5/2013 | Hunzinger et al. | |
| 2013/0243259 A1 | 9/2013 | Fujita et al. | |
| 2013/0259307 A1 | 10/2013 | Torii et al. | |

OTHER PUBLICATIONS

George and Hawkins, "Towards a Mathematical Theory of Cortical Micro-circuits", PLoS Computational Biology, Oct. 2009. (Year: 2009).*

"Behnke. "Hierarchical neural networks for image interpretation." In: Springer Science & Business Media. Jun. 13, 2003 (Jun. 13, 2003) Retrieved from . p. 6-8, 135, 142, 145."
"Bergthold et al, A Study of Parts-Based Object Class Detection Using Complete Graphs, 2009", Jun. 29, 2017 00:00:00.0.
"Fidler et al, Similarity-based cross-layered hierarchical representation for object categorization, 2008", Jun. 29, 2017 00:00:00.0.
"Pedersoli et al, A Coarse-to-fine approach for fast deformable object detection, 2011".
"Sun et al, Articulated Part-based Model for Joint Object Detection and Pose Estimation, 2011".
"Yang et al, Articulated Pose Estimation with Flexible Mixtures-of-parts, 2011".
Canadian Office Action dated Jan. 2, 2020 for Application No. 3,028,919.
Markopoulos, Angelos P., et al., "On the use of back propagation and radial basis function neural networks in surface roughness prediction", J Ind Eng Int (2016) vol. 12, Issue 3, pp. 389-400, Mar. 9, 2016.
Canadian Office Action dated Nov. 3, 2020 for Application No. 3,028,919.
Schuster, M., et al., "Bidirectional Recurrent Neural Networks", IEEE Transactions on Signal Processing, vol. 45, Issue: 11, pp. 2673-2681, Nov. 30, 1997.
Canadian Office Action for Application No. 3,028,921, dated Jan. 2, 2020.
"European Search Report dated Jan. 20, 2020 for Application No. 16906432.6".
"European Search Report dated Jan. 22, 2020 for Application No. 16906435.9."
Lin, Liang, et al., "A stochastic graph grammar for compositional object representation and recognition", Pattern Recognition, Elsevier, GB, vol. 42, No. 7, Jul. 1, 2009 (Jul. 1, 2009), pp. 1297-1307, XP026026922, ISSN: 0031-3203, DOI: 10.1016/J.PATCOG.2008.10.003.
Decision to Grant a Patent in Japanese Appln. No. 2018567585, dated Aug. 4, 2020, 5 pages (with English translation).
International Preliminary Report on Patentability in International Appln. No. PCT/US2016/038516, dated Dec. 25, 2018, 8 pages.
International Search Report and Written Opinion in International Appln. No. PCT/US2016/038516, dated Sep. 7, 2016, 9 pages.
Office Action in European Appln. No. 16906432, dated Jan. 29, 2020, 4 pages.
Office Action in European Appln. No. 16906432, dated Sep. 24, 2021, 7 pages.
Office Action in Japanese Appln. No. 2018567585, dated Mar. 3, 2020, 9 pages (with English translation).
Lin et al., "A stochastic graph grammar for compositional object representation and recognition," Pattern Recognition, Oct. 22. 2008. 42:1297-1307.
Office Action in Chinese Appln. No. 201680088615.1, dated Sep. 21, 2022, 16 pages (with English translation).

* cited by examiner

SYSTEMS AND METHODS FOR GENERATING DATA EXPLANATIONS FOR NEURAL NETWORKS AND RELATED SYSTEMS

CROSS-REFERENCE TO RELATED APPLICATIONS

This application is a continuation of U.S. patent application Ser. No. 14/822,730, filed on 10 Aug. 2015, which claims the benefit of U.S. Provisional Application Ser. No. 62/035,039, filed on 8 Aug. 2014, all of which are incorporated in their entireties by this reference.

TECHNICAL FIELD

This invention relates generally to the artificial intelligence field, and more specifically to new and useful system and methods for generating data explanations for neural networks and related systems in the artificial intelligence field.

BACKGROUND

Despite advances in computer vision, image processing, and machine learning, recognizing visual objects remains a task where computers fail in comparison with the capabilities of human. Recognizing an object from an image not only requires recognizing the image in a scene but also recognizing objects in various positions, in different settings, and with slight variations. For example, to recognize a chair, the innate properties that make a chair a chair must be understood. This is a simple task for a human. Computers struggle to deal with the vast variety of types of chairs and the situations in which a chair may be present. The problem is even more challenging when considering the problem of detecting multiple objects in a scene. Models capable of performing visual object recognition must be able to provide explanations for visual datasets in order to recognize objects present in those visual datasets. Visual object recognition is a specific case of a more general problem in artificial intelligence: pattern recognition (and its inverse, pattern generation). Pattern recognition is a problem in other fields and mediums outside of image processing such as speech recognition, natural language processing, and other fields. Thus, there is a need in the artificial intelligence field to create new and useful methods for generating data explanations for neural networks and related systems. This invention provides such new and useful methods.

DESCRIPTION OF THE PREFERRED EMBODIMENTS

Figure 1:
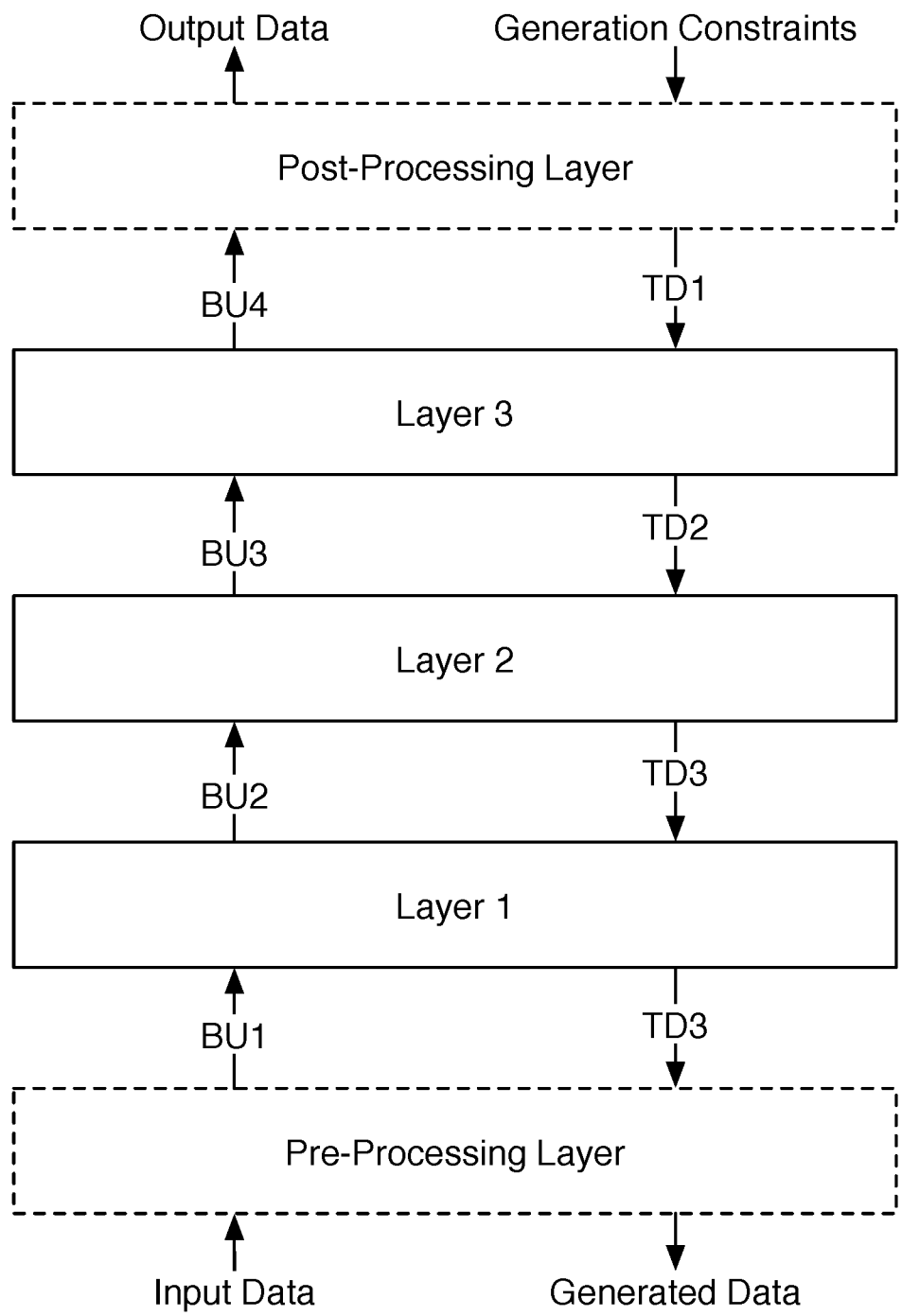
FIG. 1 is flowchart representation of a Layer-based Bidirectional Data-transformation system (LBD)

The following description of preferred embodiments of the invention is not intended to limit the invention to these preferred embodiments, but rather to enable any person skilled in the art to make and use this invention.

The system and methods for generating data explanations of preferred embodiments function to improve the generation and/or inference tasks of neural networks and related systems. The system and methods preferably apply bi-directional transformations through various layers of a data-transformation system (e.g., a neural network). To address the challenges of pattern recognition, the system and methods of preferred embodiments may be applied to generate data explanations for pattern data. Data explanation generation is important for many pattern recognition models, including convolutional neural networks, recursive cortical networks, and other models consisting of a series of layers, where each layer applies a transformation to the layer below. In a first objective task of a neural network, an inference output may be produced. Herein, a process and system for generating such an inference output is described. In particular, one variation can apply reverse generation transformations to preferably improve the inference output. In second objective task of a neural network, a generation or imagining output may be produced. The system and method described herein may additionally or alternatively be applied to producing such a generated output. A variation of the generation process preferably uses inference transformations at least in part to preferably improve the generation output. The system and methods are preferably used in neural networks and more specifically recursive cortical network, but the system and methods may additionally be used for any suitable layered data-transformation system.

1. Neural Networks and Related Systems

Neural networks and related systems, including recursive cortical networks (RCNs), convolutional neural networks (CNNs), HMAX models, Slow Feature Analysis (SFA) systems, and Hierarchical Temporal Memory (HTM) systems, may be used for a wide variety of tasks that are difficult to complete using standard rule-based programming. These tasks include many in the important fields of computer vision and speech recognition.

Neural networks and related systems can be represented as distributed processing elements that implement summation, multiplication, exponentiation or other functions on the elements incoming messages/signals. Such networks can be enabled and implemented through a variety of implementations. For example, a system may be implemented as a network of electronically coupled functional node components. The functional node components can be logical gates arranged or configured in a processor to perform a specified function. As a second example, the system may be implemented as a network model programmed and/or configured to be operative on a processor. Such a network model is preferably electronically stored software that encodes the operation and communication between nodes of the network. Neural networks and related systems may be used in a wide variety of applications and can use a wide variety of data types as input such as images, video, audio, natural language text, analytics data, widely distributed sensor data, or other suitable forms of data and/or datasets.

The neural networks and related systems can be described as systems including a number of transformative layers. Input data (typically having a low level of abstraction) entering these systems may be transformed by a first layer to create first intermediate data; the first intermediate data may be transformed by a second layer to create second intermediate data, and so on. This process may continue until the system reaches a final layer, at which point output data (typically having a higher level of abstraction) is created from the intermediate data. This process may be used to generate data explanations (e.g., inference) for a dataset by identifying local features of a dataset, identifying more complex features based on the local features, and so on, each layer increasing the level of abstraction of the data explanations.

Note that a layer may be capable of producing both intermediate and output data; that is, output of an intermediate layer may be used both as input to higher layers and as data explanation output (e.g., output to another process).

Some neural networks and related systems may be used in a complementary manner; in this manner a similar system to the one previously described may be initialized from a final layer (or intermediate layer) to transform data from a higher level of abstraction to a lower level of abstraction. This process is generally referred to as generation (and as imagination in the case where generation is not influenced by data generated from input data).

In particular, for artificial intelligence applications (e.g., computer vision), the neural networks and related systems can be capable of performing both inference and generation by changing the direction of data propagation, as shown in FIG. 1. In such a system, henceforth referred to as a Layer-based Bidirectional Data-transformation system (LBD), inference may be performed by the passing of "bottom-up messages" (e.g., BU1, BU2 . . . ) from lower layers to higher layers of the system, while generation may be performed by the passing of "top-down messages" (e.g., TD1, TD2 . . . ) from higher layers of the system to lower layers of the system. In LBDs, the number of layers may be arbitrarily large to allow for any gradation of the input/output transformation process.

As an example of inference, input data to an LBD may consist of an image. The image data may be introduced directly to the LBD (as a BU1 message) or may first be pre-processed (for example, by increasing image contrast of the input data to prepare it for transmission as a BU1 message). The BU1 message, consisting of the image data (which may or may not be pre-processed), is transformed by Layer 1 to create a transformed dataset (e.g., detected contours by location), represented as a BU2 message. This BU2 message is further transformed by Layers 3 and 4 to successively create BU3 and BU4 messages respectively. The BU4 message in this case, for example, might represent a dataset corresponding to detected objects in the image data. This BU4 message may in turn be processed by a post-processing layer (e.g. processing BU4 into a written description of the objects in the image).

As an analogous example of generation, an LBD may be provided with generation constraints (e.g. a written description of objects desired to be in a generated image) passed through a post-processing layer, or more directly with a TD1 message (e.g. a dataset corresponding to objects desired to be contained within generated image data). The TD1 message is transformed by Layer 3 into a TD2 message, then by Layer 2 into a TD3 message, and so on. These layer transformations effectively predict probable lower abstraction level data based on the input to the layer (e.g. the TD1 message in the case of Layer 3). Eventually, the LBD may output generated data that represents image data predicted by the system based on generation constraints or other initializing input. Additionally or alternatively, the LBD may be provided with no input data for generation, resulting in the assumption of default values (or alternatively, randomly generated values) stored within the system. The output of the LBD is a special case of generation referred to as imagination.

While the previous two examples represent inference of input data and/or BU1 messages, and generation based on generation constraints and/or TD1 messages, such inference or generation can originate at any layer of the LBD; for example, the LBD may perform inference on data provided directly to Layer 3. Neural networks and related systems preferably apply complementary generation and/or inference during inference and/or generation processes.

2. Recursive Cortical Networks

While the systems and methods of preferred embodiments described within this application are preferably applicable to any neural networks and related systems fitting the above description (i.e., LBDs), implementation details and examples will relate in particular to recursive cortical networks (RCNs).

Figure 2:
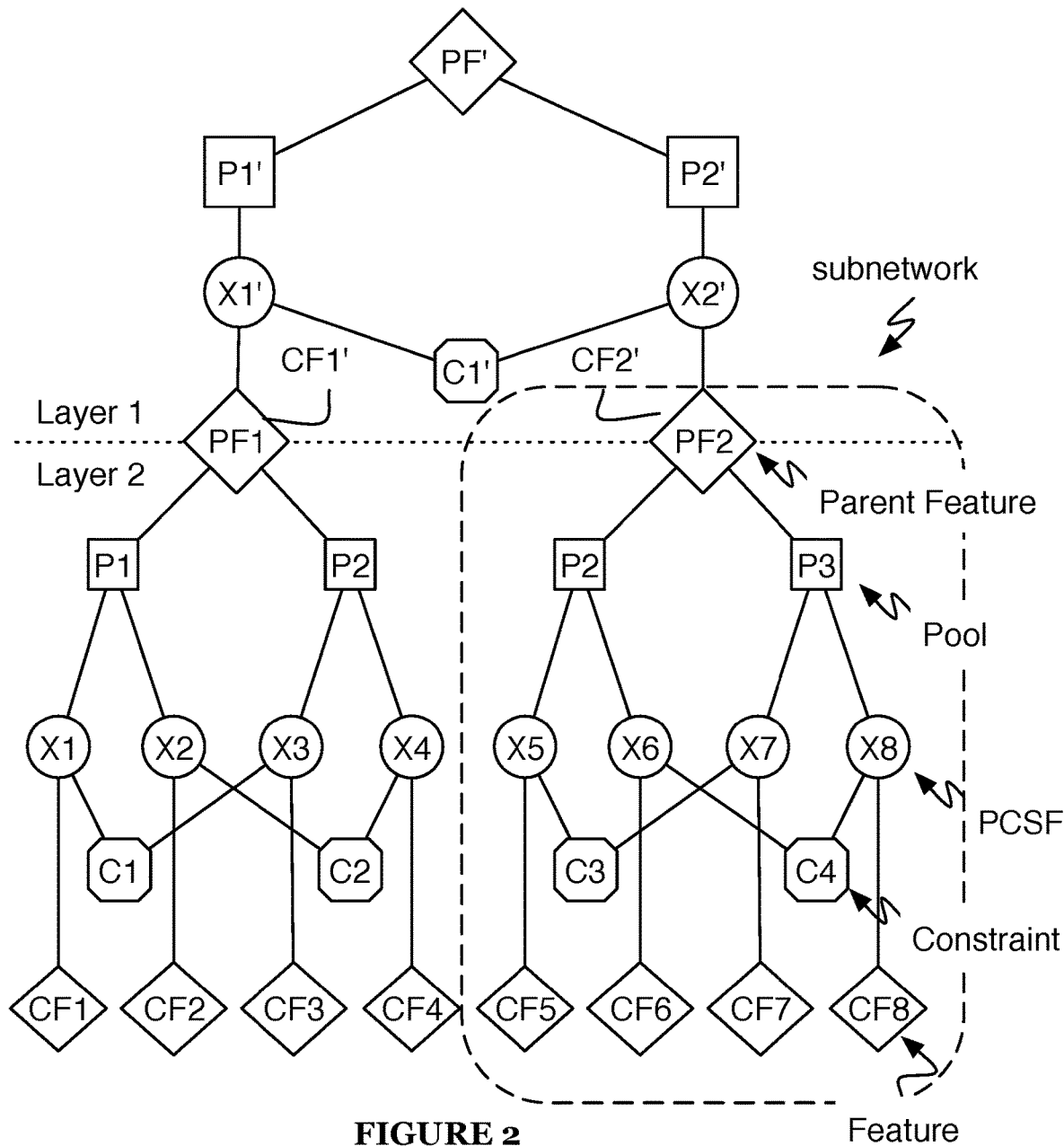
FIG. 2 is a schematic representation of a recursive cortical network (RCN)
Figure 3:
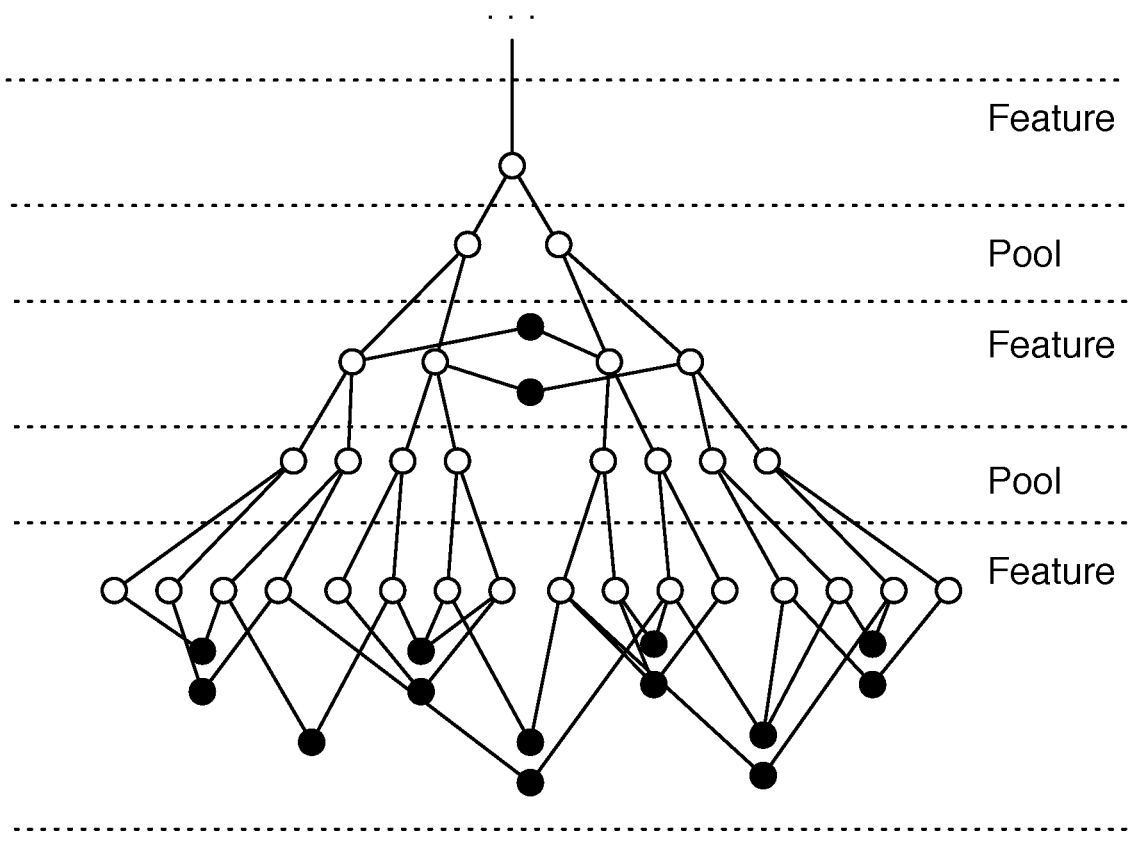
FIG. 3 is a schematic representation of a recursive cortical network (RCN)

As shown in FIG. 2, a recursive cortical network (RCN) may include a plurality of sub-networks. A sub-network preferably includes at least a parent feature node, a pool node, a parent-specific child feature node (or PSCF node for short), and at least a constraint node. RCNs can be configured for different operational modes, including a first mode of operation: generation mode, and a second mode: inference mode. RCNs are preferably a hierarchically organized network of interconnected sub-networks in various parent-child relationships as shown in FIG. 3. The RCN may alternatively be a single layer of a collection of sub-networks or a single sub-network.

Figure 4:
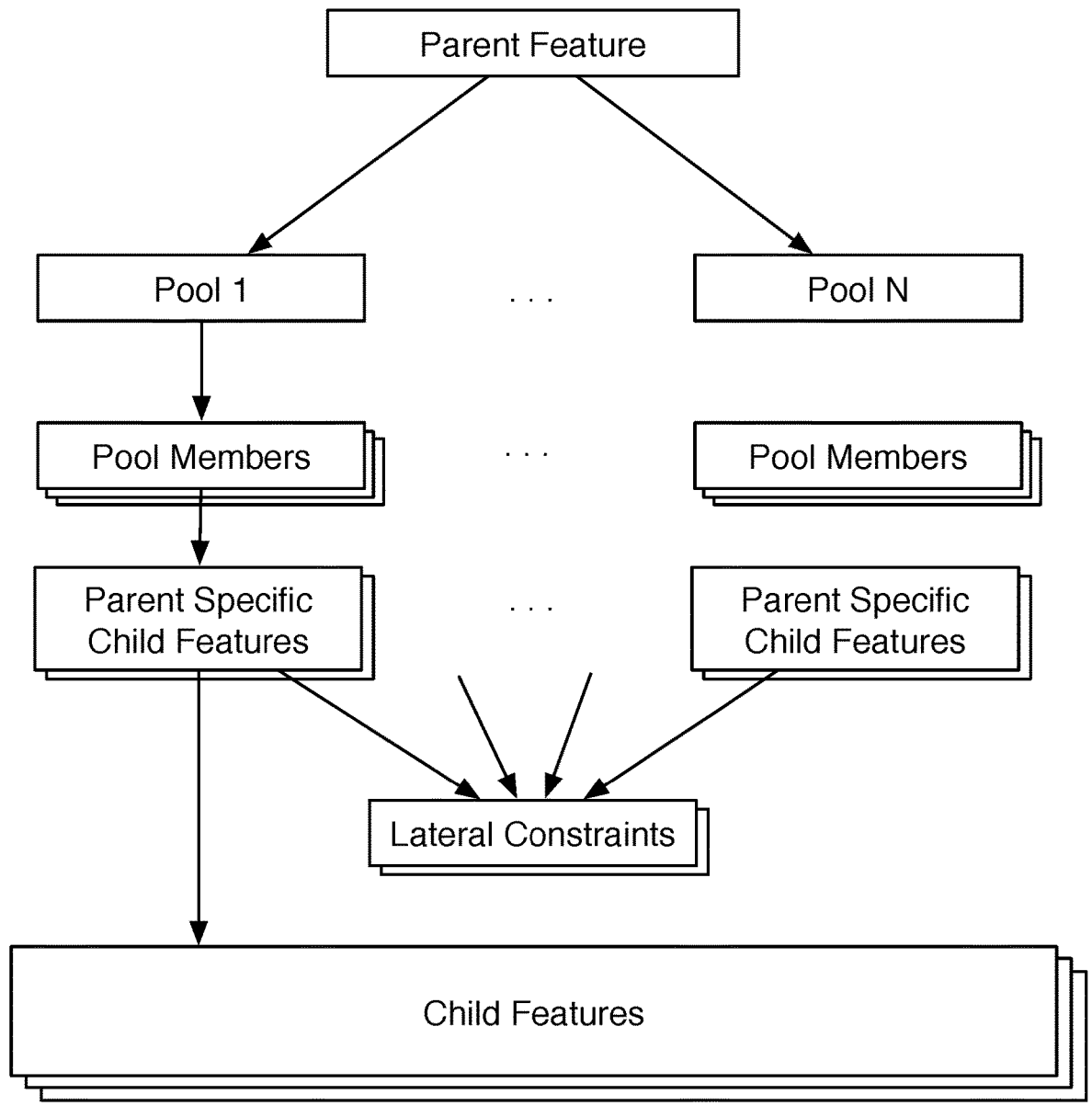
FIG. 4 is a schematic representation of a sub-network of an RCN.

As shown in FIG. 4, various instances and instantiations of RCN sub-networks are preferably constructed, connected, and used recursively in the hierarchy of the RCN. The architecture of the hierarchical network may be constructed algorithmically or through at least partial user selection and configuration. The RCN can be described as alternating layers of feature nodes and pool nodes in a neural network. The sub-networks have feature input nodes and feature output nodes, and the feature nodes are used to bridge or connect the sub-networks. As shown in FIG. 4, the feature nodes can be constrained to various invariant patterns through the use of constraint nodes that bridge constraints across pools and spatially or temporally different sub-networks. Each node of the hierarchical network will preferably have parent node connections and child node connections. Generally, the parent node connections are preferably inputs during generation and outputs during inference. Conversely, the child node connections are outputs during generation and inputs during inference. In the variation of a single layer (or non-hierarchical) sub-networks are arranged as siblings. The sub-networks as described below may have interactions through various forms of constraint nodes.

The sub-networks may be set up in a variety of different configurations within a network. Many of the configurations are determined by constraint nodes that define the node-selection within a sub-network, between sub-networks, or even between networks. Additionally, sub-networks can be set up to have distinct or shared child features. The sub-networks are additionally arranged in hierarchical layers. In other words, a first sub-network may be the parent of a second sub-network. Similarly, the second sub-network may additionally be the parent of a third sub-network. The layers of sub-networks are preferably connected through shared parent feature nodes and child feature nodes. Preferably, a child feature node of a top layer sub-network is the parent feature node of a lower sub-network. Conversely, the parent feature nodes of a sub-network can participate as the child feature nodes of a higher sub-network. The parent feature nodes of the top-level sub-networks are preferably the inputs into the system. The child features of the bottom/lowest sub-networks are preferably the outputs of the system. Connecting multiple sub-networks can introduce multi-parent interactions at several nodes in the network. These interactions can be modeled using different probabilistic models in the nodes.

Connecting the sub-networks in a hierarchy can function to promote compact and compressed representations through sub-network re-use. Parent feature nodes of one sub-network can participate as child feature nodes in multiple parent sub-networks. A similar benefit is that invariant representations of a child sub-network can be re-used in multiple parent sub-networks. One example of where this would be applicable is in the case of an RCN representing visual objects. The lower-level sub-networks can correspond to parts of objects and the higher level sub-networks (i.e., upper layer sub-networks) can represent how those parts come together to form the object. For example, the lower level sub-networks can correspond to representations for the body parts of an image of a cow. Each body part will be invariantly represented and will be tolerant to location transformations like translations, scale variations, and distortions. The higher-level sub-network then will specify how the body parts come together to represent a cow. Some of the lower-level body parts of a cow could be re-used at a higher level for representing a goat. For example, the legs of both of these animals move similarly and hence those parts could potentially be re-used. This means that the invariant representations learned for the legs of cows can be automatically re-used for representing goats.

Figure 5:
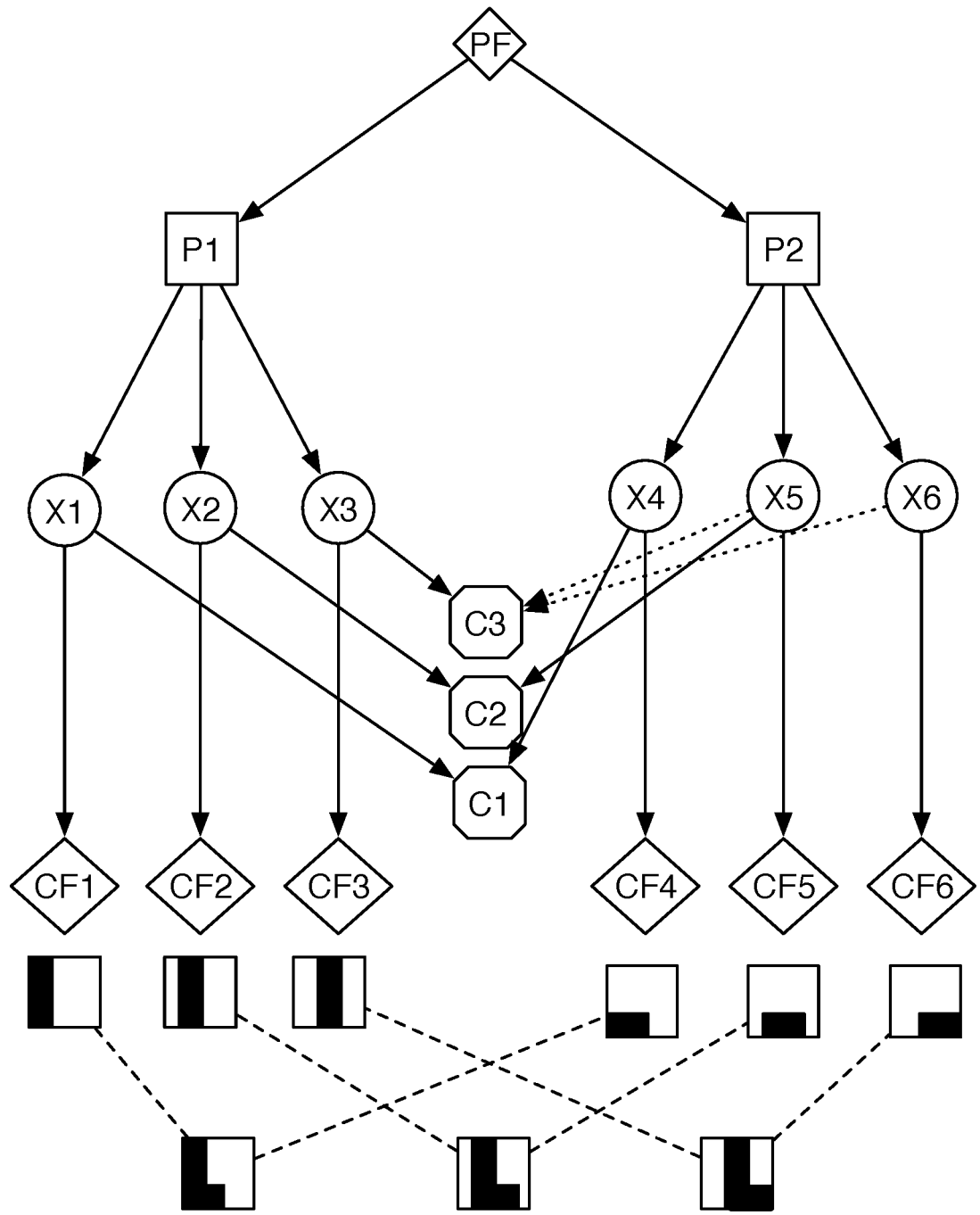
FIG. 5 is a schematic representation of a sub-network of an RCN.

The RCN may be used both for generating data explanations (e.g. classifying objects in an image) and for generating data predictions (e.g. an image containing some set of objects). During data explanation generation, nodes of the RCN preferably operate on input data features and propagate the node selection/processing through the hierarchy of the RCN until an output is obtained from a parent feature of a top-layer sub-network. A combination of propagating information up in the hierarchy (to higher parent layers) and downwards (towards the final child features) may be used to accomplish this output. During data prediction generation, the RCN preferably starts from a general generation request that is directed, fed, or delivered to the parent feature nodes of the top layer sub-networks. The nodes preferably operate on the information and propagate the node selection/processing down the hierarchy of the RCN until an output is obtained from the child feature nodes of the bottom-layer sub-networks. As shown in FIG. 5, a sub-network functions to provide node selection operation between a parent feature and a child feature. The sub-network is the basic building block of the RCN. The sub-network, in the case of generation, is preferably mapped or networked from a higher-level feature to a set of lower level features, such that the lower level feature activity (e.g., visual features of an image) is determined by the activities of a higher level feature (e.g., object name). In the case of inference, the sub-network is preferably mapped or networked from lower level features to higher level features, such that the higher level feature activity (e.g., object name) is determined by the activities of a lower level feature (e.g., visual features of an image). The general architecture of a sub-network preferably includes a single top-level node that is a parent feature node. The parent feature node (PF1) preferably includes connections to at least two pool nodes (P1 and P2). Each pool node preferably includes connections to a plurality of PSCF nodes (X1, X2, X3, X4, X5, X6). Constraint nodes (C1, C2, C3) may additionally be within a sub-network. The constraint nodes preferably connect to other PSCF nodes. The constraint nodes define limitations, rules, and restrictions between the at least two PSCF nodes. The PSCF nodes preferably connect to a child feature node 150 (CF1, CF2, CF3, CR4, CF5, CF6). The instances of sub-networks within the RCN may or may not share commonalities with other sub-networks. The functional operation of each node can vary in number and configuration of connections, connection weighting, and/or any other aspect. In some edge cases, a sub-network may not include only one node selection option. In one exemplary edge-case, the sub-network can be defined with no selection options so that activation of the parent-feature results in activation of the child feature. For example, the parent feature node may connect to one pool, and the one pool then connects to one PSCF node.

The nodes of the network preferably are configured to operate, perform or interact with probabilistic interactions that determine node activation, selection, ON/OFF, or other suitable states. When activated by a parent node, the node will preferably trigger activation of connected child nodes according to the selection function of the node. The nodes preferably represent binary random variables or multinomial random variables as in a Bayesian network, though other suitable node models may alternatively be used. A feature node (e.g. parent feature node, child feature node) is preferably a binary random variable node that can have multiple parents and multiple children. When multiple parents are involved (i.e., multiple nodes connected through a parent connection/input connection), the interactions between the parent connections are preferably treated as the superposition of the connections. Additionally or alternatively, multi-parent interactions may be modeled in any manner. Multi-parent interactions can be probabilistically modeled in the node using canonical models such as Noisy-OR and Noisy-Max gates. The child connections of a feature node preferably encode the probabilistic relations between the feature and the pools. In some RCNs, all pools of a feature are active if the feature is active, but such activation can be modified according to a probability table or any suitable mechanism. Each link from a node to a pool node encodes a probability table of the kind P(Pool|Feature), as shown in the table below.

| Feature\Pool | FALSE | TRUE |
| --- | --- | --- |
| FALSE | 1 − q | q |
| TRUE | p | 1 − p |

In the case where the pool nodes are ON if and only if the feature is ON, p and q will be zero. However, other values of p and q may alternatively be used. The pool nodes are preferably treated as binary nodes. The pool nodes preferably have one parent connection that represents the probability table shown above. Pool nodes can have multiple connections to child nodes. In one variation, the child node connections represent instant-by-instant connections. Instant-by-instant connections preferably implement an OR selection function over the pool members with associated probabilities. Put another way, the instant-by-instant connections represent a multinomial random variable connection. The pool members (modeled as possible activated sets of PSCF nodes) are preferably configured to act as binary random variables, at least one of which gets selected when a pool is selected according to the distribution P(M|Pool). The pool-members represent functional combinations of child-features. For example, pool-member 1 could be child-feature 1 AND child-feature 2. Constraint nodes are preferably treated as binary nodes whose observations are instantiated to 1. The probability tables used in these constraint nodes implement the kind of constraint that is enforced between the parent node that connects to the constraint node. Constraints are often AND or OR constraints but can be any suitable selection function. The constraint nodes may additionally be nodes with greater than pair-wise connections.

The parent feature node functions as a high level feature node. In generation operation mode, the parent feature node is the input of the sub-network. In inference operation mode, the parent feature node is the output of the sub-network. The parent feature node is configured to implement a selection function when activated. Selection functions are preferably logical functions such as a Boolean-based selection function for AND, OR, NOT, XOR operations of node selection. For example, if P1 and P2 are pool nodes of PF1, and PF1 is configured for an AND selection function, then activation of PF1 activates P1 and P2 pools. The selection function may include a randomized selection mechanism for determining selecting between different options such as if the operator is an XOR and only one connected node can be selected. Additionally, randomized selection may be biased or weighted according to node connection weighting of the connections between the parent feature node and the pool nodes. Selection functions may alternatively be probabilistic selection functions or any suitable function used in selecting a connection option.

The pool node functions as a node for selecting from a set of child features. Child features associated with a pool node preferably share a relationship, have a correlation, or are variations of one another. For example, a pool may be for different variations in position of a pixel pattern. Described another way, the PSCF nodes are preferably an invariant representation of variations of a feature. In FIG. 5, P1 is an invariant representation for 3 different translations of the vertical line, and P2 is an invariant representation for three different translations of a horizontal line. Herein, the term pools may be used to refer to the possible set of PSCF nodes for a particular pool node. The possible set of PSCF nodes is preferably any PSCF node with a connection to the pool node. The pools may be constrained. For example, members of a pool can be the set {(a), (b AND c), (d), (e)} where a, b, c, d, e are child features. Similar to the parent feature node, the pool node is configured to implement a selection function when activated. The selection function can be any suitable function but is preferably a logical operator as described above for the parent feature node. The selection function can similarly be randomized, biased and/or weighted. The selection function of the pool node preferably selects, triggers, activates, or otherwise signals the corresponding PSCF node(s). Additionally, the selection function may be limited or overridden based on activated constraint nodes. Activated constraint nodes may define which node is selected within a pool based on the selection of a PSCF node (one connected through a constraint node). Similarly, it may determine the set of possible PSCF nodes for a pool node and/or determine the weighting or preference of the pool nodes. Pool nodes within a sub-network can be sequentially evaluated such that constraint nodes maybe applied to other pools when appropriate.

The PSCF node functions as options of invariant feature options. A PSCF node maps to one child feature, and a PSCF node has only one parent pool node. PSCF nodes may additionally be connected or coupled with a constraint node. The constraint node preferably defines relationships between multiple PSCF nodes. The constraint nodes preferably connect to other PSCF nodes of a different pool, a different time, and/or a different sub-network. PSCF nodes are preferably not shared between sub-networks. Child feature nodes (which may be the parent nodes of lower sub-networks) however may share connections to multiple sub-networks.

The constraint node functions to restrict the kinds of patterns that are allowed in the sub-network. The constraint nodes preferably connect to at least two PSCF nodes. Greater than two PSCF nodes may alternatively be connected through a constraint node. The constraint node may additionally be between any suitable types of nodes. The constraint node could be between pool nodes. The constraint node can additionally be between two types of nodes. For example, a constraint node can connect a PSCF node and a pool node. Herein, the variation where the constraint node connects PSCF nodes is shown as the preferred implementation, but the constraint node can be used in enforcing constraints between any set of nodes (of any type) in the RCN. The constraint nodes may be between pool nodes, between a pool node and a PSCF node, or any suitable nodes of the network. The PSCF nodes are preferably not of the same pool and in some cases are not in the same sub-network. The constraint nodes preferably connect PSCF nodes of the same layer, but they may alternatively connect sub-networks in different layers. Additionally, any suitable PSCF node may have a connected constraint node and have any suitable number of connected constraint nodes. Constraint nodes can enforce restrictions, rules, and constraints within selection of nodes in other pools, in other sub-networks, and/or in different times. The network is preferably evaluated in an ordered fashion such that PSCF nodes that are connect through a constraint node are preferably not evaluated simultaneously. When a first PSCF node is active or selected, constraint nodes connected to the first PSCF node may be activated. Subsequently, restrictions of the constraint node are activated/enforced on the connected PSCF nodes. The constraint node, similar to other nodes, may have a selection function that determines how it activates PSCF nodes. The constraint node preferably impacts how a pool node can select PSCF nodes. In one variation, the selection function of the constraint node may be an AND logical operator such that the constraint node enforces selection of the connected PSCF nodes if one of the PCSF nodes is active. In another variation, the selection function of the constraint node may be an OR logical operator such that it modifies the possible PSCF nodes within a pool. Any suitable selection function may be used. Some constraint nodes may have a basic or simple constraint wherein activation of one node corresponds to selection of a second node. These may be represented as a direct connection without a node since the selection logic is a direct correspondence between the nodes.

Constraint nodes can include lateral constraint nodes, external constraint nodes, and temporal constraint nodes. Lateral constraint nodes function to restrict the kinds of patterns of a sub-network based on the interaction between pool nodes of the sub-network. External constraint nodes functions to enforce invariant patterns across different sub-networks. Similar to how lateral constraint nodes can ensure that the representations in different pools are consistent with each other by imposing constraints on which PSCF nodes of one pool node are allowed to go with PSCF nodes in another pool, external constraint nodes can maintain compatibility across the hierarchy. Temporal constraint nodes function to enforce relationships across RCNs and sub-networks operating for other instances of time. On a basic level, the members of a pool (e.g., the PSCF nodes with a shared parent pool node) can have relationships that specify the order they occur in time. The temporal constraint nodes are preferably simple direct connection constraints, where activation/selection of one node enforces the selection of a specified node in a second instance. In an alternative description, the constraint nodes can function analogous to specifications in a Markov chain.

The PSCF nodes can have more than one type of constraint nodes enforced on them. The lateral constraint nodes impose coordination between PSCF nodes in different pools of the same network, and the external constraint nodes impose coordination between PSCF nodes in different sub-network. The constraint nodes are preferably set to not result in conflicts (e.g., where one constraint activates a node and the other specifies it should not be activated). Ranking of the constraint nodes, or heuristics for the order of enforcing constraint nodes, or other suitable rules may be used resolve conflicts and races between constraint nodes.

3. Method for Generating Data Explanations

Figure 6:
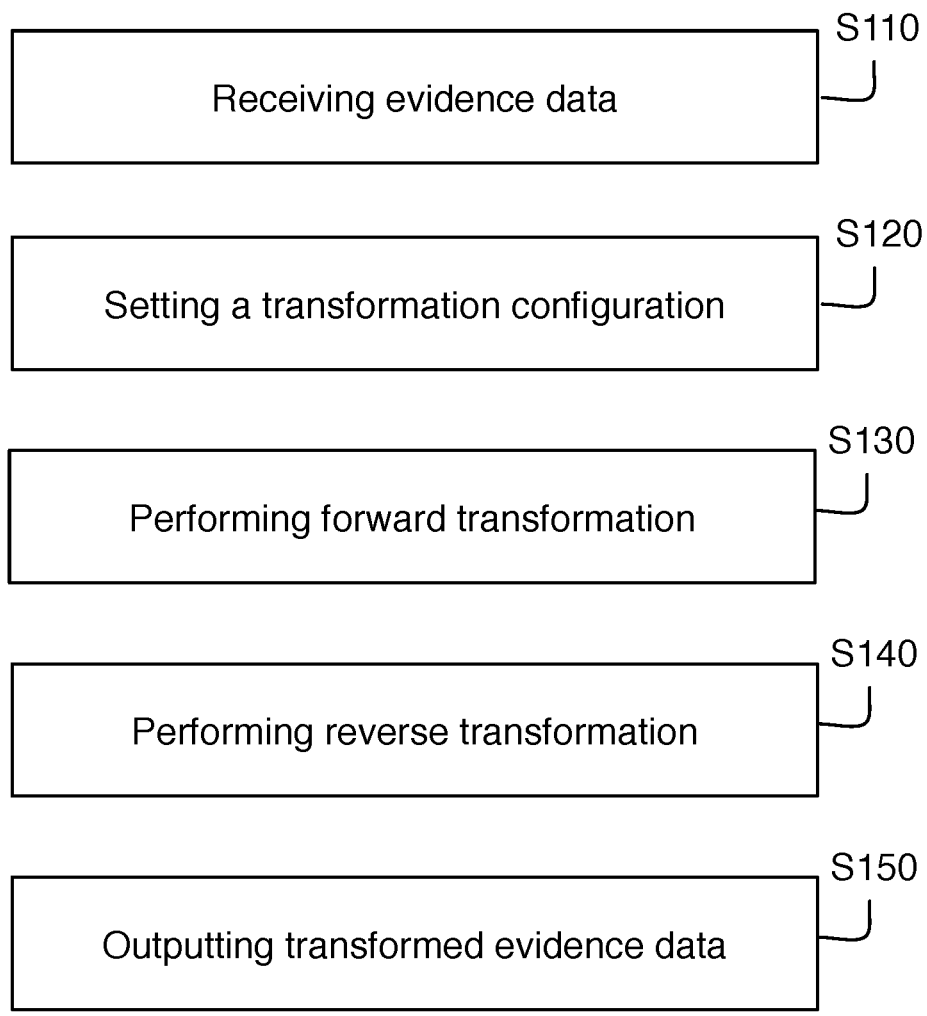
FIG. 6 is a chart representation of a method of a preferred embodiment.

As shown in FIG. 6, a method 100 for generating data explanations in a Layer-based Bi-directional Data-transformation system (LBD) includes receiving evidence data S110, setting a transformation configuration S120, performing forward transformation S130, performing reverse transformation S140, and outputting transformed evidence data S150.

The method 100 functions to generate explanations for evidence data received by a Layer-based Bi-directional Data-transformation system (LBD). The method 100 can be used to infer patterns in a wide variety of data types such as images, video, audio, speech, medical sensor data, natural language data, financial data, application data, traffic data, environmental data, and the like. In one implementation, the method 100 may be used for image detection to detect the presence of objects in an image or video; the method 100 may additionally or alternatively be used to classify detected objects.

The method 100 generates explanations for evidence data (received in Step S110) through a series of forward and reverse transformations (Steps S130 and S140 respectively), eventually outputting transformed evidence data (Step S150), which may be interpreted or used as explanations for the received evidence data. Forward and reverse transformations may be performed on the entire set of evidence data or on a subset of the evidence data; the set of evidence data transformed may be different from transformation to transformation. Further, forward and reverse transformations may be performed in any order and at any time, including simultaneously. The details regarding transformation dataset choice, order, and timing are preferably governed by a transformation configuration (set in Step S120).

In general, forward transformations can be thought of as providing explanations for evidence data, and reverse transformations can be thought of as predicting evidence data given particular explanations. As previously mentioned, forward and reverse transformations can also be thought of as increasing or decreasing the level of abstraction for given data. While forward and reverse transformations work in operate directions through the layers of a LBD, a method of a preferred embodiment preferably applies both forms of transformations to enhance the output. These descriptions are meant as guides for understanding forward and reverse transformation and are not meant to limit or define forward and reverse transformation (described in more detail herein).

Figure 7:
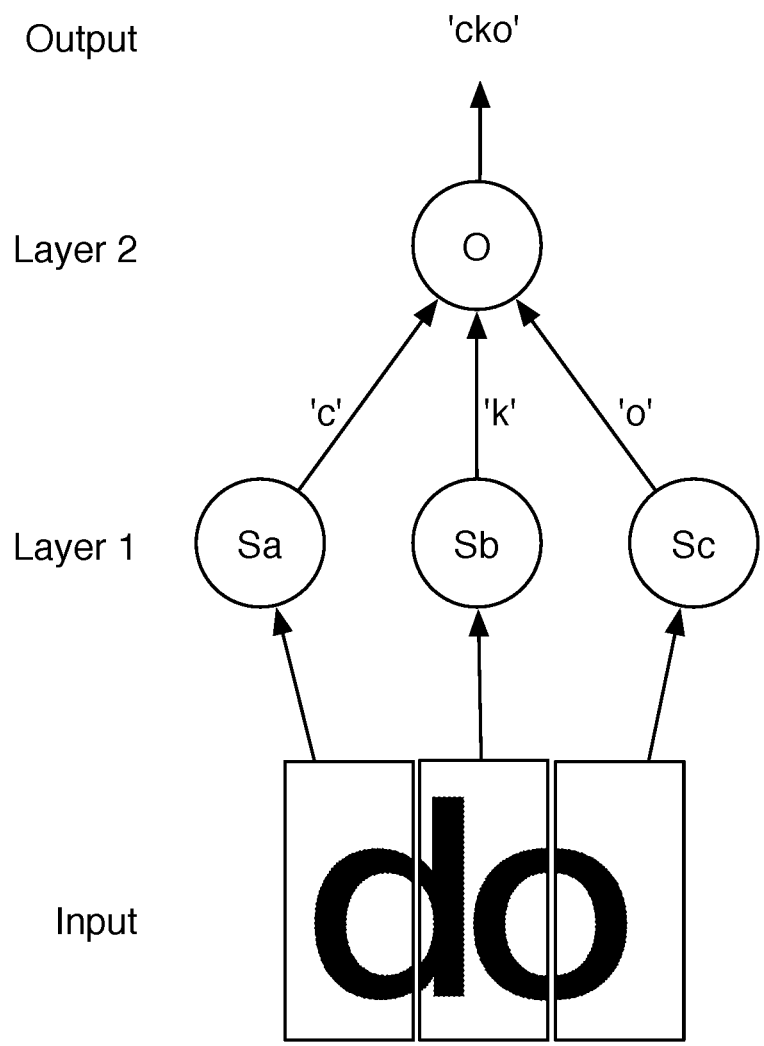
FIG. 7 is a schematic representation of inference using forward transformations.

While reverse transformations operate substantially opposite in the abstraction direction to forward transformations (e.g., forward and reverse transformations act as abstraction level incrementors and decrementors respectively), the method can preferably apply reverse transformations to assist in increasing data abstraction level (e.g., creating explanations for evidence data). Consider a reference unidirectional neural network designed to recognize characters in an input image as shown in FIG. 7. This reference neural network instance consists of multiple sub-networks (Sa, Sb, Sc), designed to recognize characters in different sections of the image (a, b, c); the network then outputs the characters detected by the sub-networks in order corresponding to the order of the image sections (i.e., a→b→c) at a higher level node. The neural network is designed such that sub-networks Sa, Sb, and Sc transform the input data into intermediate data that contains a likelihood distribution across character and position space. For example, one member of the intermediate data output by Sa might include the likelihood of the character 'a' being present at position vectors (x1,y1) given the input data. This intermediate data is processed by sub-network O to create a likelihood distribution of character strings across character string and position space, which can be output as the most likely string. In the case of the example image of FIG. 2, this most likely string is 'cko', which is obviously not the string shown in the image ('do'). In this example of neural network processing, the neural network of FIG. 7 returns the incorrect result because it is unable to consider the surrounding context of each image section. This can be addressed by attempting to build contextual knowledge into Layer 2, for instance, storing prior probabilities of character combinations given the characters in adjoining image sections. For example, there might be some probability that a 'c'-'l' pair is actually a 'd', or there might be probabilities of various strings (e.g. maybe there is a low probability of 'cko' occurring in a particular language). This approach may suffer in the case where various character pairs are equally likely or where the knowledge stored in the neural network is insufficient (e.g., if c-l pairs and 'd's are equally likely or if the relatively probabilities of 'cko' and 'do' appearing in the training set are not representative of real world data). Another approach would be to include more data from Layer 1; for example, instead of sending characters and position data, Layer 1 might also include character features and position data. This approach is in some ways similar to simply performing feature detection on the image (as opposed to on image sections), and it may suffer because it requires a substantial increase in data transmitted from Layer 1 to Layer 2.

Figure 8:
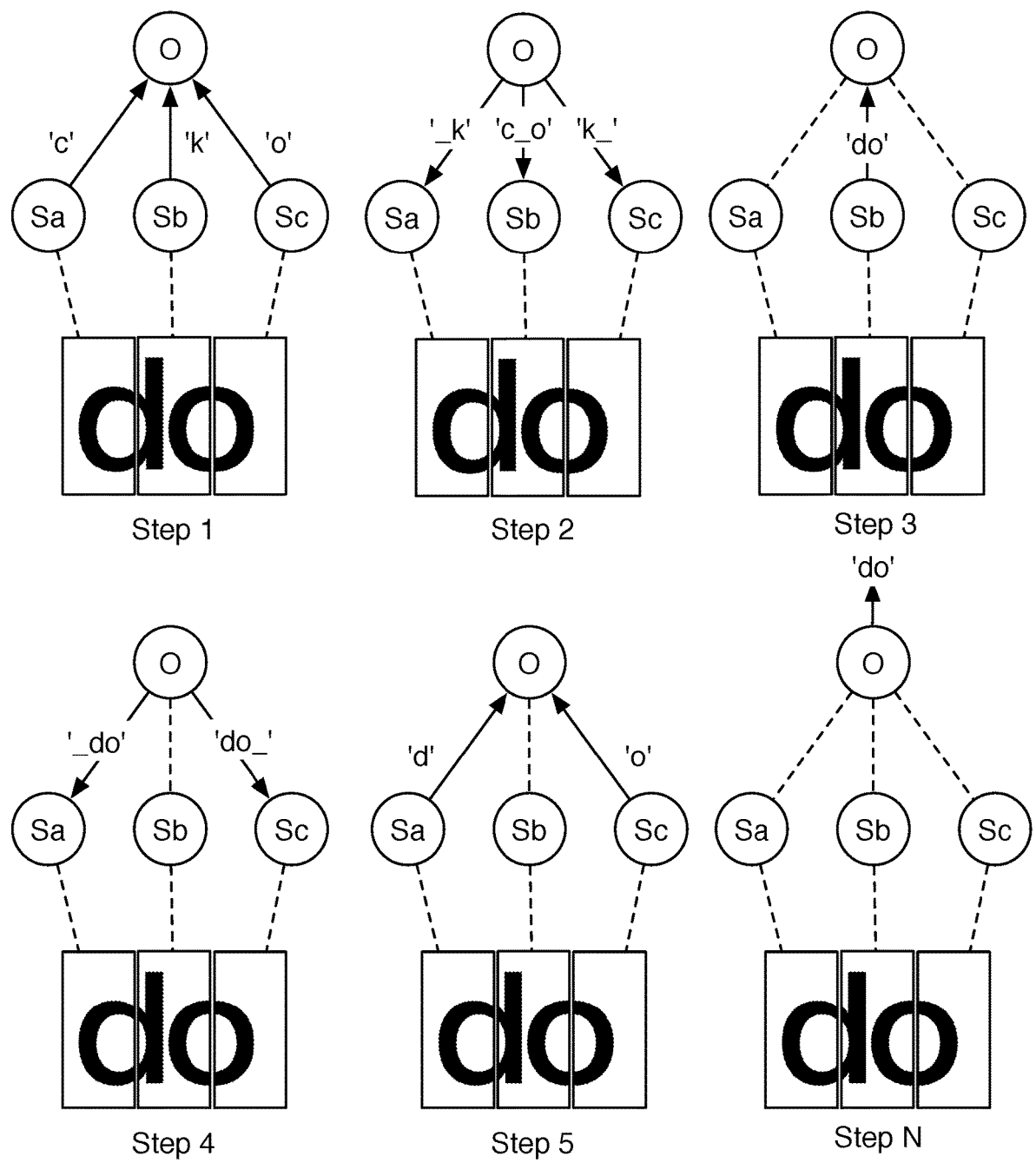
FIG. 8 is a schematic representation of inference using combined forward and reverse transformations.

Applying a bi-directional processing of the method preferably addresses issues of the above reference neural network instance, and serves as an example of generation to improve inference. The neural network in the reference case above may be similar in every regard, except that the neural network processing is bi-directional applying both forward and reverse transformations. This neural network can use recursion to allow context (e.g. higher level data) to influence the output of lower level sub-networks, as shown in FIG. 8. During the first step of recursion, Layer 1 outputs the same likelihood distributions as in the uni-directional network instance. Instead of outputting the character string 'cko', Layer 2 passes information about regional neighbors to each subnetwork (e.g., information to Sa about the content of Sb) during the second step. This information may be the full likelihood distribution or some subset of it (e.g. the top five likelihoods) or any other suitable contextual information. The sub-networks process this information and Sb calculates a substantially changed likelihood distribution (in particular, noting that the likelihood of containing a 'd' and an 'o' are higher now than the previous maximum choice of 'k'). As a result, Sb sends this updated likelihood distribution to O in step 3. O then sends the updated likelihood information to Sa and Sc in step 4, which in turn re-calculate their likelihood based on the updated likelihood information and pass it back to O in step 5. This process may be repeated as often as necessary until some threshold is reached (e.g. a number of recursion steps, a threshold maximum likelihood, etc.) at step N, at which point O outputs the final character string. The recursion steps of this example neural network are analogous to possible forward and reverse transformations of the method 100. Note that in more complex neural networks (or other LBDs), recursion steps may include multiple forward transformations before a reverse transformation or vice versa; transformation order and direction are preferably determined by the method 100. The bi-directional processing can be applied to the end objective of forming an inference output or to the objective of forming a generation output. The method 100 is preferably implemented by a recursive cortical network as previously described, and more preferably by a recursive cortical network as described in U.S. patent application Ser. No. 13/895,225, which is incorporated in its entirety by this reference. Additionally or alternatively, the method 100 may be implemented by any suitable neural network or related system (e.g. LBDs).

Step S110, receiving evidence data, functions to provide the LBD with data for which data explanations are desired. Receiving evidence data preferably includes receiving data that has been pre-processed and more probably reduced, converted, or extracted into data features (e.g., into specifications of attributes and associated values) but may additionally or alternatively include data that has not been preprocessed. For example, an image may be subdivided into a plurality of image blocks, and the pixel patterns in the plurality of blocks are extracted as the features. As another example, Step S110 may include receiving detected edges of an image (pre-processed data) or an un-processed image. Step S110 may additionally or alternatively include performing evidence data processing (potentially even if data has been pre-processed). Evidence data processing preferably includes any type of data processing that transforms data into a suitable form for processing by the LBD. Some examples of evidence data processing for images might include edge detection, resolution reduction, contrast enhancement; some examples of evidence data processing for audio might include pitch detection, frequency analysis, or mel-frequency cepstral coefficient generation. Evidence data may be received from any suitable source; in some cases, evidence data might include output data from an LBD. An example of such evidence data might include a dataset containing information on characters contained within an image (for example, the output of the neural network of FIG. 7).

When evidence data has been received (and processed if desired), the evidence data is preferably transmitted, fed into, or directed to an input of the LBD. In the case of RCNs, the evidence data is preferably directed to the child feature nodes of the lowest sub-network level. Additionally or alternatively, evidence data may be directed to any LBD node or connection (e.g. data that has already gone processing through levels 1 and 2 of an LBD previously may be directly inserted into level 3).

Step S120, setting a transformation configuration, functions to provide the LBD with instructions regarding how forward and reverse transformations are to be performed. Step S120 preferably determines when and where in an LBD forward and reverse transformations (i.e. Steps S130 and S140 respectively) are performed and when output is generated. Step S120 may include setting a static configuration, for example, given an input to a first layer (L1) in a five layer system, Step S120 may direct the LBD to perform transformations according to the following:

$$\text{Input} \to L_1 \to L_2 \to L_3 \to L_2 \to L_3 \to L_4 \to L_3 \to L_4 \to L_5 \to \text{Output}$$

The static configuration preferably applies both forward and reverse transformations as can be seen in the example above. The static configurations may be fully defined for how the transformation is applied from input to output. Alternatively, static configurations may be transformation patterns that cover a subset of layers, which can be triggered or performed in response to some trigger such as in the dynamic transformations configurations described below. The reverse transformations may be shallow (e.g., progressing only one or a few abstraction layers in the reverse direction), but reverse transformations may alternatively be deep (e.g., progressing many abstraction layers, even back to the starting layer). Mixed patterns may additionally be defined by a sequence of transformations, such as three reverse, two forwards, one reverse, two forward, one reverse, and two forwards as a pattern of moving a net progression of one layer forward. Any suitable transformation pattern may alternatively be used and in any suitable combination.

Additionally or alternatively, Step S120 may include setting a dynamic transformation configuration; for example, performing recursion based on a probability threshold (such as performing recursion until the highest probability of a distribution is above 0.8 or some maximum number of recursion cycles is reached). As another example, Step S120 may perform recursion based on convergence; e.g., performing recursion until the difference between high-level outputs across recursion cycles falls below some threshold or a maximum number of recursion cycles is reached.

While the examples mentioned here describe recursion between layers, Step S120 may additionally or alternatively include setting recursion between nodes or another other LBD components. In the case that the LBD is an RCN, Step S120 may additionally or alternatively include instructions for propagation for lateral constraints.

Step S130, performing forward transformation, functions to infer an explanation or classification from evidence data. Inference can include pattern detection, classification, prediction, system control, decision making, and other applications involving inferring information from data. Forward transformation preferably occurs on a layer-by-layer basis (i.e., simultaneously across a layer) in an LBD, but may additionally or alternatively occur on a sub-network basis, a node-by-node basis, or in any other suitable manner. In the case of the example shown in FIG. 7, each sub-network of Layer 1 performs forward transformation by receiving image data for its associated section, calculating a likelihood distribution across character and position space, and outputting that likelihood distribution. Likewise, sub-network O (i.e., Layer 2) performs forward transformation by receiving the likelihood distributions as evidence, calculating the likelihood distribution of strings across stringspace (i.e. the space of possible strings), and outputting the string with the maximum likelihood. Forward transformation may be performed by a sub-network as shown in FIG. 7, or it may be performed by a node, or by another suitable LBD component or substructure.

Step S130 preferably includes receiving evidence at an input of an LBD unit (e.g. a node, a subnetwork, or a layer), performing a mathematical transformation of the input evidence (e.g. calculating a probability distribution or ratio), and outputting the transformed evidence at an output of the LBD unit. The mathematical transformation performed by Step S130 preferably calculates posterior probability distributions for the LBD unit based on received updated likelihood data, but may be additionally or alternatively calculate any suitable mathematical function as part of the transformation. Step S130 preferably utilizes belief propagation techniques for communicating information, but other probabilistic inference approaches may alternatively be implemented. Belief propagation includes passing messages between nodes and performing computations in the nodes under different assumptions.

Step S130 preferably includes performing forward transformations based on the transformation configuration set in Step S120.

Figure 9:
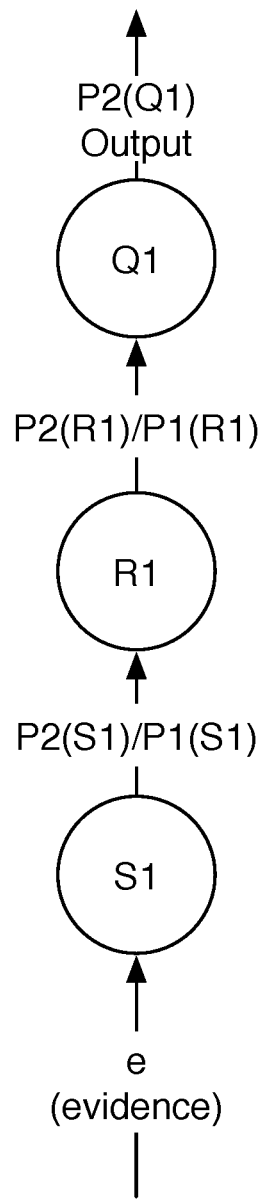
FIG. 9 is flowchart representation of forward transformation of a method of a preferred embodiment.

An example network is as shown in FIG. 9. Encoded in the network are the prior probabilities $P_1(S_1)$, $P_1(R_1)$, $P_1(Q_1)$ and the likelihood relationships $P(e|S_1)$, $P(S_1|R_1)$, $P(R_1|Q_1)$. When evidence e is introduced to the system, it first is input at S1. Given a general form of evidence e, it can be stated, $$P_2(S_1) = \sum_{e_i} P(S_1 | e) = \sum_{e} \frac{P(e|S_1)P_1(S_1)}{P(e)}$$

This sum is valid for a discrete probability distribution across e, but a person skilled in the art will recognize that this can be generalized to a continuous probability distribution. In the simplifying example that e takes a particular value, $$P_2(S_1) = \frac{P(e|S_1)P_1(S_1)}{P(e)}; P(e) = \sum_{S_1} P(e|S_1)P_2(S_1)$$

After calculating the posterior probability of S1, (P2(S1)), this posterior probability is sent from S1 to R1, where it is used to update the posterior probability of R1 (in essence, the ratio of the posterior of S1 to the prior of S1 is a function used to correct or weight the likelihood p(S1|R1)). The following is a derivation of the relation between the posterior probability of R1 and the posterior probability of S1, $$P_2(R_1) = P(R_1 | e) = \frac{P(e|R_1)P_1(R_1)}{P(e)}$$

$$P(e|R_1) =$$

$$\frac{P(e, R_1)}{P(R_1)} = \frac{\sum_{S_1} P(e, R_1, S_1)}{P(R_1)} = \sum_{S_1} \frac{P(e|S_1)P(S_1|R_1)P(R_1)}{P(R_1)}$$

$$P_2(R_1) = P_1(R_1)\sum_{S_1} \frac{P(e|S_1)P(S_1|R_1)}{P(e)} = P_1(R_1)\sum_{S_1} \frac{P_2(S_1)P(S_1|R_1)}{P_1(S_1)}$$

It is clear from this derivation that the posterior may be calculated at R1 given only the ratio of the posterior and prior probabilities of S1. Likewise, it can be shown that this relationship holds for Q1 (requiring only the transmission of the ratio of the R1 prior and posterior, and not the S1 prior/posterior or the evidence).

For Q1, $$P_2(Q_1) = P(Q_1 | e) = \frac{P(e|Q_1)P_1(Q_1)}{P(e)}$$

$$P(e|Q_1) = \frac{P(e, Q_1)}{P(Q_1)} =$$

$$\frac{\sum_{S_1,R_1} P(e, R_1, S_1, Q_1)}{P(Q_1)} = \sum_{S_1,R_1} \frac{P(e|S_1)P(S_1|R_1)P(R_1|Q_1)P(Q_1)}{P(Q_1)}$$

$$P_2(Q_1) = P_1(Q_1)\sum_{S_1,R_1} \frac{P(e|S_1)P(S_1|R_1)P(R_1|Q_1)}{P(e)} =$$

$$P_1(Q_1)\sum_{R_1} \frac{P(R_1|Q_1)P_2(R_1)}{P_1(R_1)}$$

This example network demonstrates a particular type of forward transformation in order to highlight the fact that calculations at any layer or node of the network are preferably directly dependent only on values output by neighboring LBD units (e.g. sub-networks, nodes, layers). The forward transformation of S130 preferably outputs a function directly dependent only on the unit at which the transformation occurs, but may additionally or alternatively output any suitable function. Direct dependence preferably reduces recalculation by units of the LBD, allows for easier re-use of unit structures (e.g. using many identical sub-networks connected together to form an LBD.)

Figure 10:
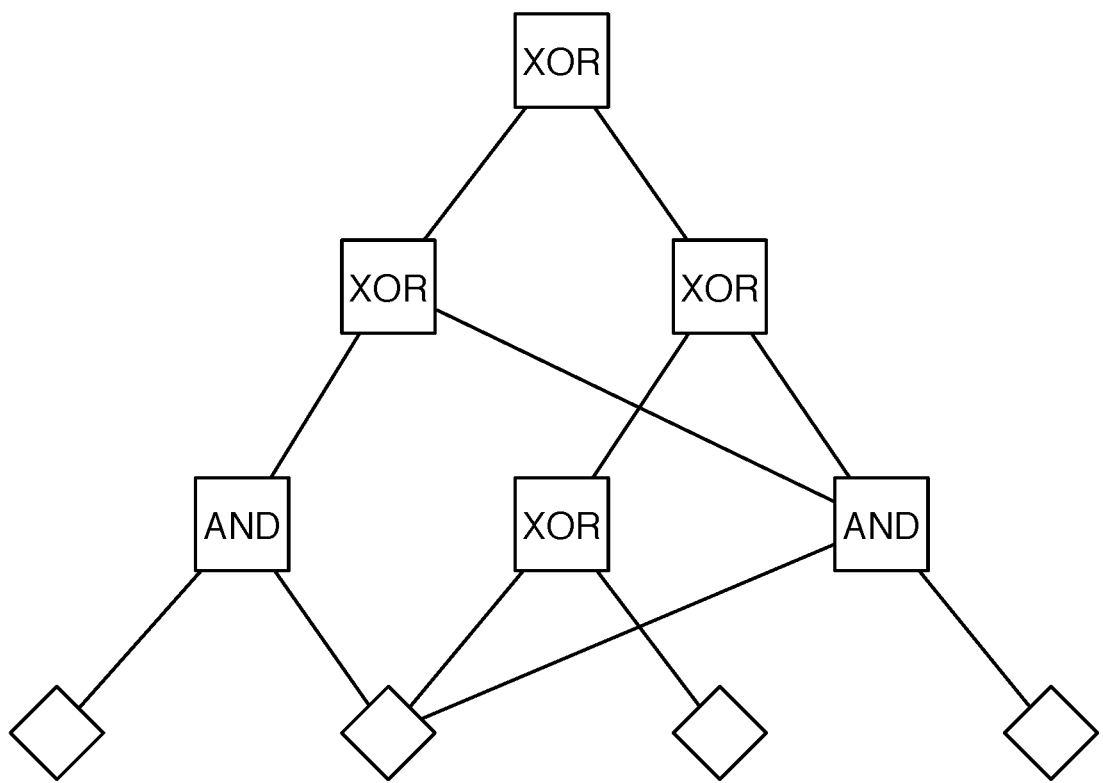
FIG. 10 is an exemplary representation of an LBD.
Figure 11:
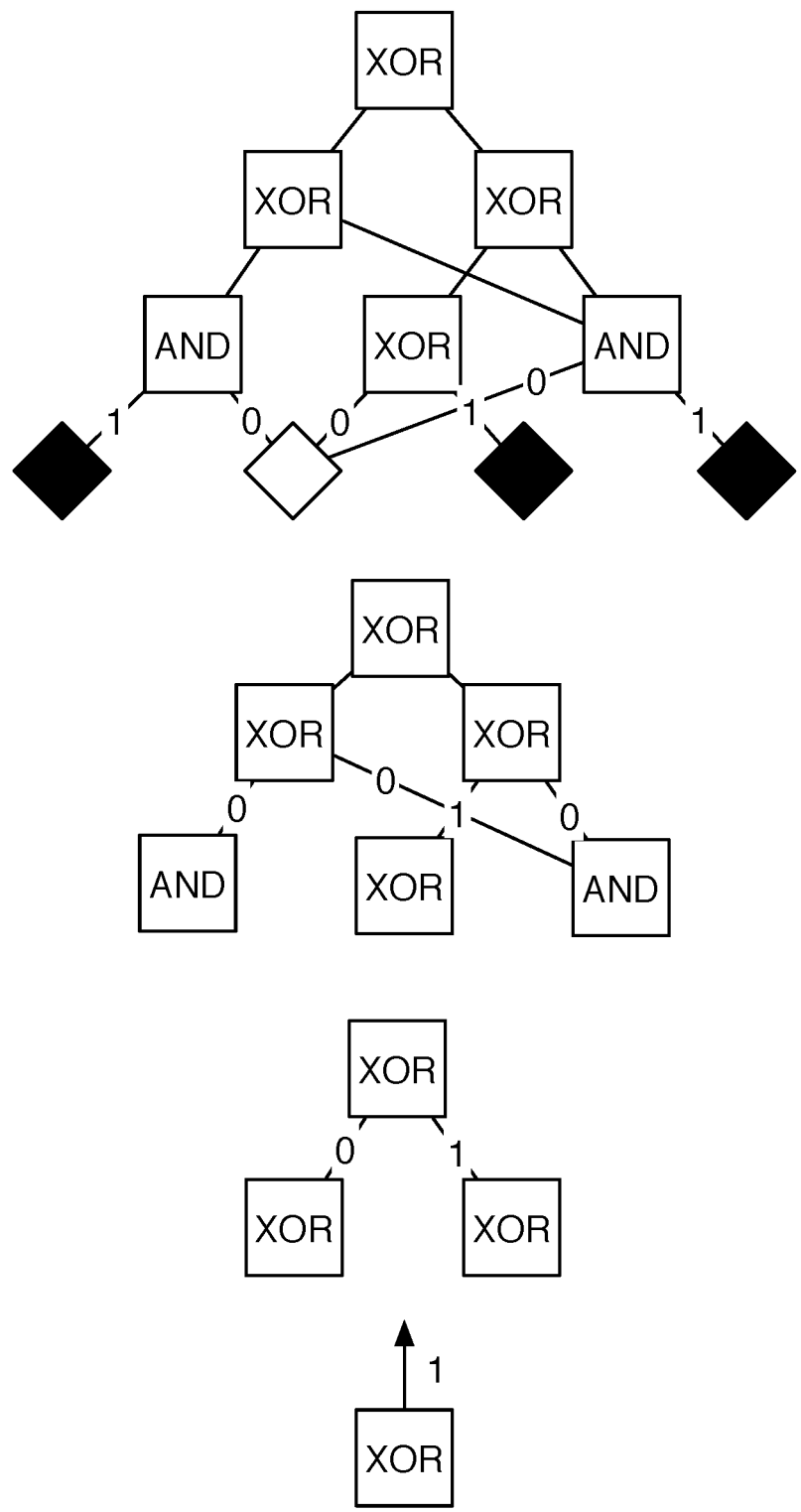
FIG. 11 is an exemplary implementation of forward transformation of a method of a preferred embodiment.

The previous example involves the explicit passing of likelihood update messages (the ratio of posterior to prior or a mathematically related term), but Step S130 also may perform forward transformation in networks where likelihood or a related concept is not directly correlated to the message passed (e.g., a binary output based on a threshold function). As shown in FIG. 10, a neural network with binary nodes computes whether a given four-bit number is prime. As shown in FIG. 11, the neural network takes input of 0xb1011 (11 in base 10). Then, the first layer of nodes calculates a response and propagates it along the network (i.e., it performs a forward transformation at layer 1). Then, the second layer of nodes takes input and calculates a response; followed by the third layer of nodes. Finally, the system outputs a 1, indicating that 11 is in fact a prime number.

This example is somewhat limited by the output capability of the nodes; as described, it can only output whether a number is prime or not. In many cases, it might be useful to know a posterior probability instead (e.g. the probability that the number is prime given some evidence). It may not be obvious, for instance, how this example system could calculate the probability that a four bit binary number with a least significant bit of one is prime. One such way to compute this probability is to perform a number of forward passes on the network over time; to compute the probability that a four bit binary number with a least significant bit of one is prime, one may simply provide as input to the system a "1" for the least significant bit and random binary variables having $p(X=1)=0.5$. The probability distribution may be estimated by the output of the system after a number of forward passes.

Figure 12:
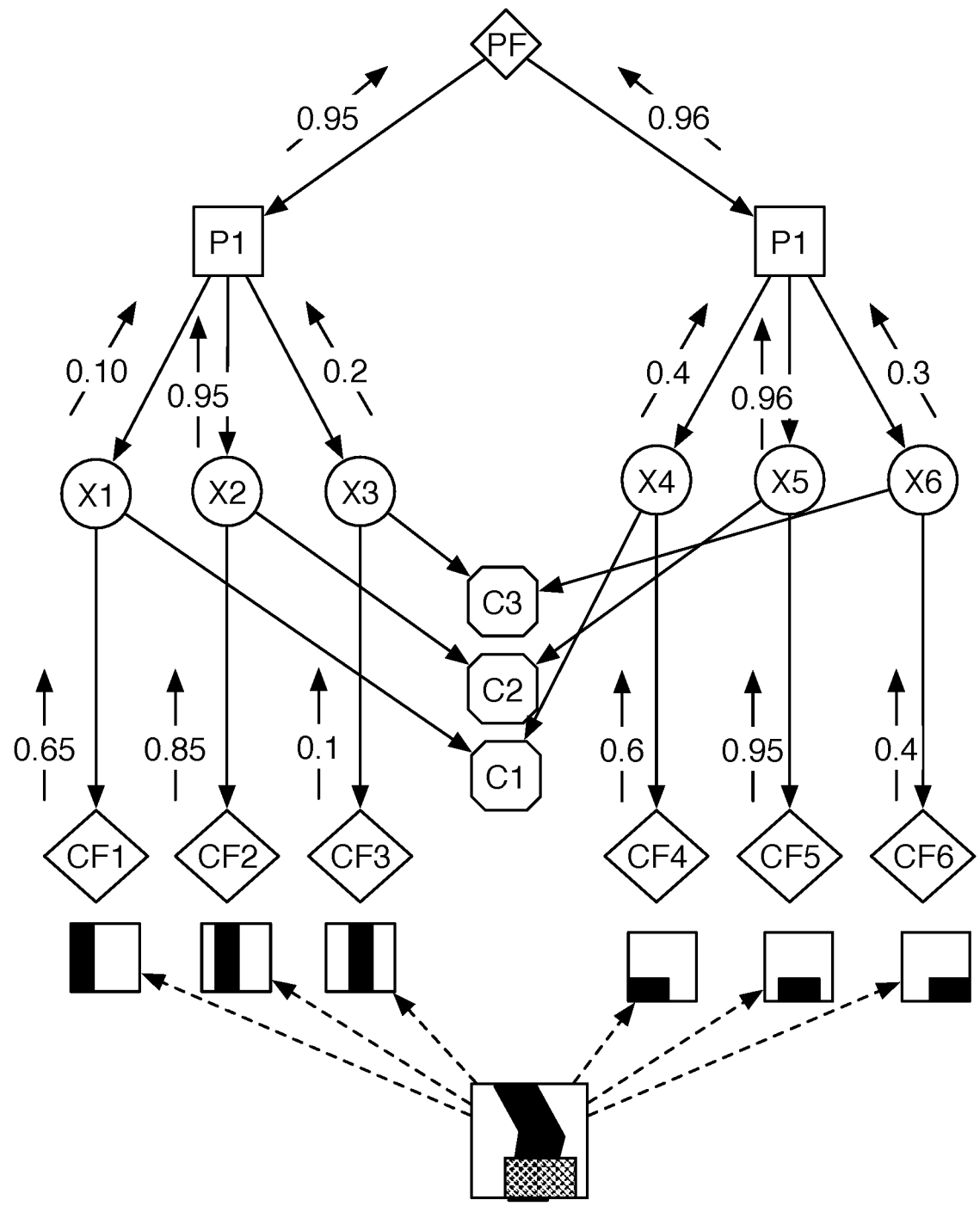
FIG. 12 is an exemplary implementation of forward transformation of a method of a preferred embodiment.

In an example shown in FIG. 12, the method 100 performs forward transformations on an RCN for inferring patterns of an image. The messages in this example represent likelihood of the evidence given that the node corresponding to the origin of the message is ON. For example, node CF2 has a higher likelihood compared to node CF1 because the representation of node CF2 is better aligned with the input evidence. The likelihood of a pool (represented by the connections originating from the pool node) is the maximum over the likelihoods of pool members. When propagating belief in a network with a sequence of inputs corresponding to subsequent time instance, the network can propagate messages in time and do temporal inference. In such a scenario, the values calculated at different nodes will be representing the probabilities given a sequence of evidence.

Propagation is preferably initiated upon receiving data feature input at the final child feature nodes of the network. The final child feature nodes are the child feature nodes of the lowest layer in the hierarchy. Data is preferably processed, converted or segmented into a set of features. The data features are then used to select or activate the final child feature nodes. In simple scenario, the presence of a feature is used to activate or not activate a child feature node. Alternatively, the likelihood parameter of the feature node can be the input. The likelihood could be a convolution similarity measurement or any suitable measure of the likelihood the feature is evident in the data. The belief propagation then continues to propagate this input up the hierarchy of the network. Within a sub-network, propagating node activation includes child feature nodes messaging a likelihood score to connected PSCF nodes; at a pool node of a sub-network, generating a likelihood score from the posterior distribution component and the likelihood score of connected PSCF nodes; at a parent feature node of the sub-network, generating a likelihood score from the posterior distribution component and the likelihood score of pool nodes connected to the parent feature node. The belief propagation then preferably continues to a higher sub-network and continues until the network propagation is exhausted or some threshold is satisfied (these constraints are preferably set in Step S120).

If used on an RCN, Step S130 may include enforcing a selection constraint on at least a second node, which functions to allow invariant relationships between pools and sub-networks to be defined and used during inference. When a node is activated, other nodes connected through a constraint node preferably have the constraints enforced upon them. The external constraint node is preferably between at least two PSCF nodes, but may alternatively be between any set of nodes. In one variation, the constraints may alternatively augment or alter the probability measure of the connected PSCF node and/or PSCF nodes of the same pool.

Step S130 preferably outputs the transformed evidence at an output of the LBD unit; the output preferably functions to process or assimilate the activated nodes of the network into an inference result. Preferably, parent feature nodes are used as an indicator of patterns. In architecting the network, different layers preferably detect patterns with different scales of granularity. On a low level, this may include detecting specific pixel patterns such as corners or lines or dots. On a high level, this could be the detecting of patterns, like that a person is detected in the image or that a message expresses happiness. Also, each sub-network is preferably customized for particular pattern identification. In the example above, a sub-network may be for invariant corner detection. If the parent node of this particular sub-network is activated, then an inference can be made that a corner is present. A mapping may exist so that activation of a parent node of a sub-network is paired with a distinct pattern label. Inferences may come from the top layer, but may alternatively be obtained through multiple layers of the network. For example, if the method were to output the inference of "a male human is smiling", the inferences that there is a human, the human is male, and that the facial expression is a smile could be obtained through multiple layers and/or sub-networks. Also, selecting which layers and/or sub-networks are used in outputting the inference can adjust the scope of the inference. For example, when generating an inference from an image, an inference from a high layer may detect that the image is of a scene of a coffee shop. A lower layer may be used to detect that there are three tables, a male, a female, and various other coffee shop objects present in the image.

Step S140, performing reverse transformation, functions to predict evidence data from the knowledge of the LBD. Additionally or alternatively, Step S140 may include predicting evidence data based on constraints presented during reverse transformation. Reverse transformation may be referred to as generation, with the special case where the LBD is not provided with external evidence being referred to as imagination. Generation can include producing static graphics, video graphics, audio media, textual content, selecting actions or responses, or any suitable medium synthesized based on a high level input.

While performing reverse transformation S140, the nodes preferably operate on the information and propagate the node selection/processing down the hierarchy of the LBD until an output is obtained from the outputs of the bottom-layer sub-networks. More explicitly, the top layer sub-networks generate samples at the same time. The output samples of the top layer sub-networks determine which lower layer sub-networks are active. Samples are then generated from the lower layer sub-networks concurrently. This output determines the active sub-networks at an even lower layer. This pattern continues through the layers of the LBD until finally samples are generated from the lowest layer of sub-networks. In generation, the output is preferably a simulated output. For example, if the LBD is used in image generation and the input was the name of an object, the output is preferably an image representative of that object name.

Figure 13:
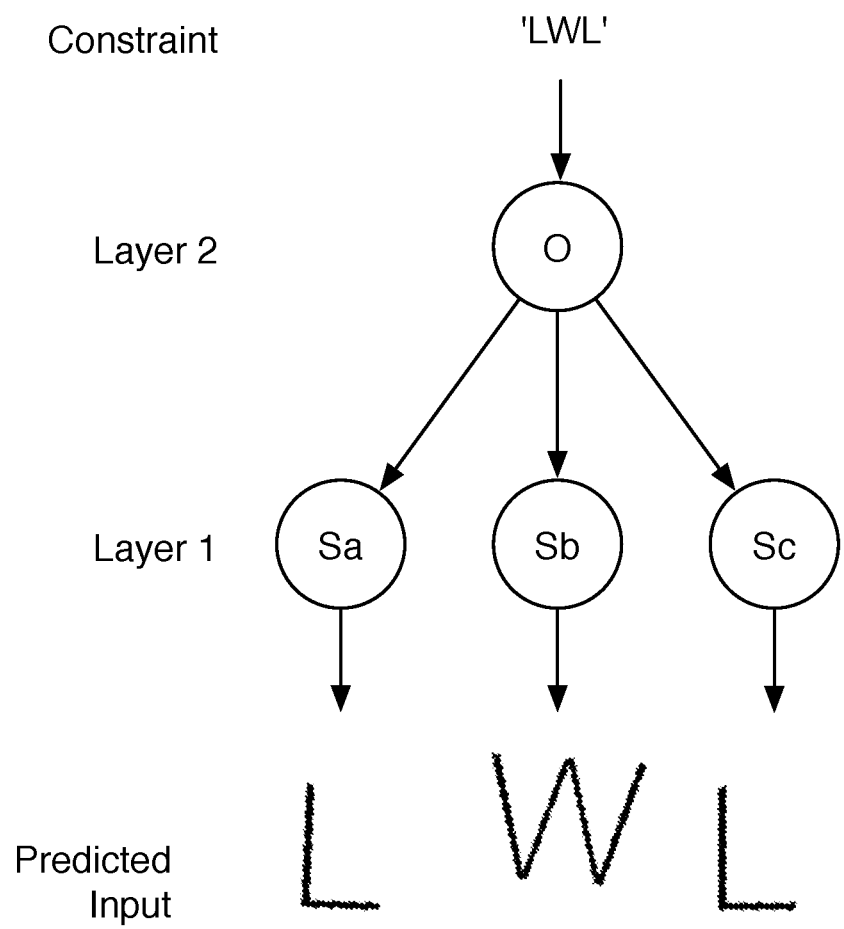
FIG. 13 is an exemplary implementation of reverse transformation of a method of a preferred embodiment.

As with Step S130, reverse transformation S140 preferably occurs on a layer-by-layer basis (i.e., simultaneously across a layer) in an LBD, but may additionally or alternatively occur on a sub-network by sub-network basis, a node-by-node basis, or in any other suitable manner. In the case of the example as shown in FIG. 13, an input string is provided to the output of the LBD. The sub-network O performs reverse transformation based on the input string through the calculation of the probability distributions for the various features of Layer 2 given the input string. Likewise, Layer 1 then performs reverse transformation by transforming the intermediate data back into predicted image data. This predicted image data may be thought of the output of a set of random variables with probability distributions defined by the LBD.

Step S140 preferably includes receiving constraints at the output of an LBD unit, performing a mathematical transformation on information stored with in the LBD given the constraints, and outputting generated data at an input of the LBD unit. The mathematical transformation performed by Step S140 preferably calculates updated likelihood distributions for the LBD unit based on constraints, but may additionally or alternatively calculate any suitable mathematical function as part of the transformation.

Step S140 preferably utilizes belief propagation techniques for communicating information, but other probabilistic inference approaches may alternatively be implemented. Belief propagation includes passing messages between nodes and performing computations in the nodes under different assumptions.

Step S140 preferably includes performing reverse transformations based on the transformation configuration set in Step S120.

Figure 14:
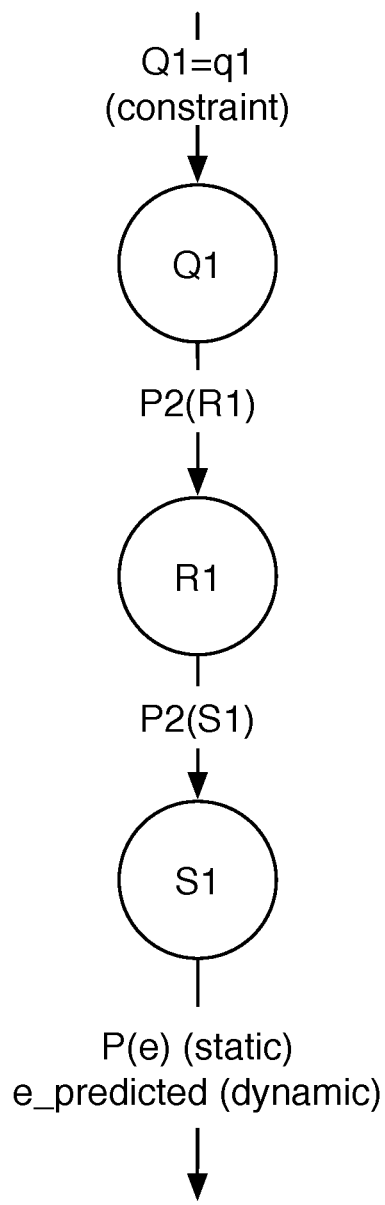
FIG. 14 is a flowchart implementation of reverse transformation of a method of a preferred embodiment.

An example network is as shown in FIG. 14. Encoded in the network are the prior probabilities $P_1(S_1)$, $P_1(R_1)$, $P_1(Q_1)$ and the likelihood relationships $P(e|S_1)$, $P(S_1|R_1)$, $P(R_1|Q_1)$. When the constraint Q1=q is introduced to the system, it can be directly plugged into the known likelihood and be used as an updated probability for R1:

$$P_2(R_1) = P(R_1 | Q_1 = q)$$

Likewise S1:

$$P_2(S_1) = P(S_1 | Q_1 = q) = \sum_{R_1} P(S_1 | R_1) P(R_1 | Q_1 = q) = \sum_{R_1} P(S_1 | R_1) P_2(R_1)$$

Further, a probability distribution describing e may be generated, $$P(e) = P(e | Q_1 = q) = \sum_{S_1} P(e | S_1) \sum_{R_1} P(S_1 | R_1) P(R_1 | Q_1 = q) = \sum_{S_1} P(e | S_1) P_2(S_1)$$

This probability distribution describes the distribution of evidence predicted by the LBD for a given constraint Q1=q. By summing across Q1, every possible output may be calculated for each layer as a function of the input to that layer, regardless of where the layer exists in a larger LBD. For an RCN, every possible object (potentially represented by Q1={q1,q2, . . . }) may be expanded into graphs for each layer computation, which allows the pool selection problem to be formulated as a factor graph. The parameters of the factors in the factor graph will depend on the input, but not the larger structure of the RCN. Pre-computing this factor graph allows an ordering of max product updated and assignments to be stored for any desired object, which enables fast object recognition. This is referred to as a static reverse transformation, which may be included in Step S140.

Step S140 may additionally or alternatively include performing a dynamic reverse transformation. Unlike the static reverse transformation, where the output is a probability distribution based on predicted activations given some constraint, the dynamic reverse transformation includes directly activating features of the LBD given the constraint to produce an example output (or, if iterated, a set of example outputs). This preferably enables the detection of novel objects and/or generalization of behavior of object parts.

This example network demonstrates a particular type of reverse transformation in order to highlight the fact that calculations at any layer or node of the network are preferably directly dependent only on values output by neighboring LBD units (e.g. sub-networks, nodes, layers). The reverse transformation of S140 preferably outputs a function directly dependent only on the unit at which the transformation occurs, but may additionally or alternatively output any suitable function. Direct dependence preferably reduces recalculation by units of the LBD, allows for easier re-use of unit structures (e.g. using many identical sub-networks connected together to form an LBD.)

The previous example involves the explicit passing of probability update messages (likelihood calculations or a mathematically related term), but Step S140 also may perform reverse transformation in networks where probability or a related concept is not directly correlated to the message passed (e.g., a binary output based on a threshold function).

Figure 15:
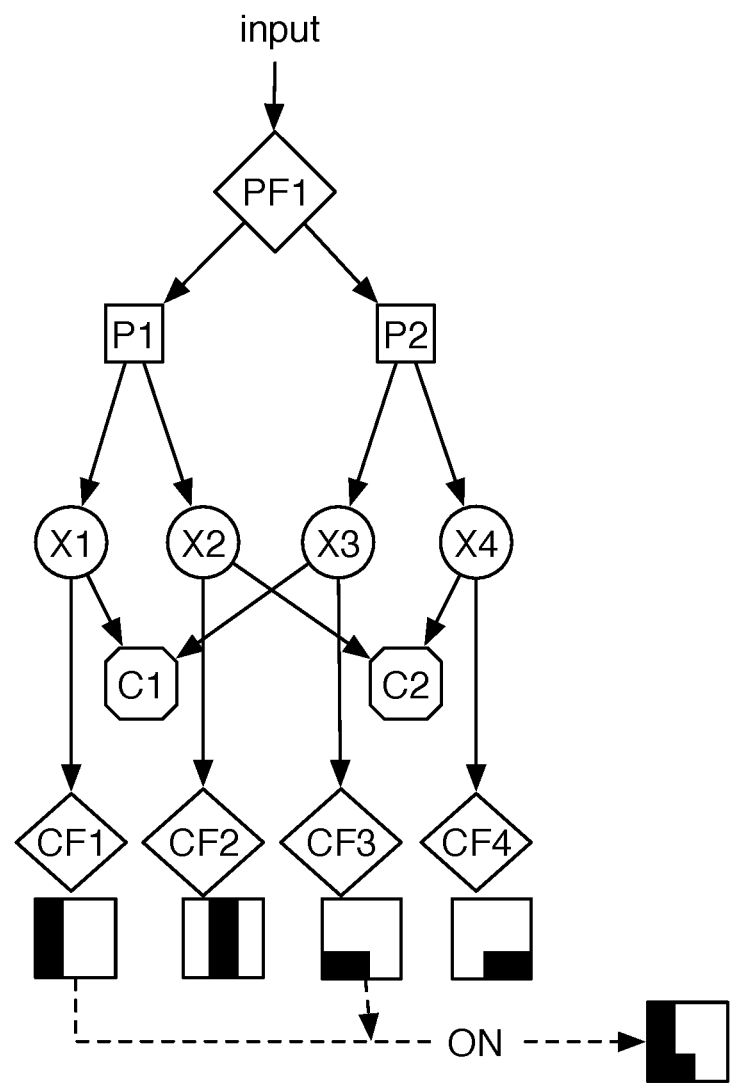
FIG. 15 is an exemplary implementation of reverse transformation of a method of a preferred embodiment.

In an example shown in FIG. 15, the method 100 performs reverse transformations on an RCN for generating a pattern. Pattern generation can be applied in various mediums and fields such as computer graphics, speech synthesis, physical modeling, data simulation, natural language processing/translation, and the like. Initially, pattern parent feature input is received. The parent features are preferably the high-level features, categorization, or other input that form the basis on which a pattern will be generated. The input is preferably delivered to the sub-network(s) in the top layer of the network. The propagation through the network then proceeds: the sub-network of the top layer is processed; the next layer of sub-networks is then processed; and the processing continues where each hierarchical layer of the network is progressively (i.e., sequentially or consecutively) processed. In some instances external constraints may define relationships between two sub-networks so one sub-network is first processed and then the other one is processed factoring in the external constraint. The order may be pre-defined or configured. Alternatively, the processing may be a race condition between the different sub-networks and the first sub-network to complete processing determines the constraint enforcement. Alternatively, they may be simultaneously processed or managed in any suitable manner. Similarly, there may be ordering of processing of nodes within a sub-network. The pools in a sub-network are preferably ordered as well. In some instances, lateral constraints may define relationships between PSCF nodes of two pools so one pool is first processed and then the other pool is processed factoring in the lateral constraint. The order may be pre-defined or configured. Alternatively, the processing may be a race condition between the different pools and the first pool to complete processing determines the constraint enforcement on the other pool. Alternatively, they may be simultaneously processed or managed in any suitable manner. Within each sub-network, the selection of nodes starts at the parent feature node, then the pool nodes are activated, and the PSCF nodes are selected. The selection of a PSCF node may be at least partially influenced or determined by the enforced selection constraint of a constraint node. Selecting pool nodes consistent with a function of the parent feature node functions to appropriately activate pools of a sub-network. As mentioned before, pools are preferably groupings of PSCF nodes that correspond to invariant features. The selection preferably occurs within a parent feature node that has been configured with a selection function. The selection function is preferably an AND relationship such that each connected pool node is activated, but any suitable selection function may alternatively be used.

Selecting at least a first PSCF node that corresponds to a child feature of the sub-network functions to select a PSCF node within the set of pool members of a pool node. The selection occurs for each of the selected pool nodes. The order of evaluating pool nodes within a sub-network may be ordered, in a random sequential and non-simultaneous manner. Alternatively, the pools may be evaluated simultaneously. Selecting of a PSCF node is preferably performed according to a selection function of a selected pool node. In one implementation, the selection function is an XOR function, where only one PSCF node will be selected. Any suitable selection function may alternatively be used. A PSCF node is preferably connected or otherwise associated with at least one child feature node in a direct relationship—when the PSCF node is selected, the connected child feature node is selected. In some variations, the PSCF node may be associated with multiple child feature nodes. Each child feature node is preferably selected when the corresponding PSCF node is selected. In yet another variation, the child feature node may additionally be associated with other PSCF nodes in the network or sub-network. A child feature node is preferably selected/activated based on the superposition of the connections to the child feature node.

Enforcing selection constraints functions to allow invariant relationships between pools and sub-networks to be defined. The constraints are preferably created to define logic between feature pairings and patterns. In a general example, if a sub-network is piecing image components together to form an image of a car, and one pool selects the body of the car, it may enforce restrictions on other pools where the wheels of the car are selected so that the wheels and car body are kept consistent. The selection constraint may be defined through a connection between at least two PSCF nodes through a constraint node. The constraint node may include any suitable number of connected PSCF nodes and may enforce any suitable selection function. In some cases, the selection constraint may be defined through a connection between two pool nodes or any suitable type of node. Similarly, the constraint node can between any two or more type of nodes such as between a PSCF node and a pool node. The enforcing of a constraint node will preferably have some form of directionality when implemented—the selection of a first node results in selection influence on a second node. The directionality can also go any direction between two types of nodes. A PSCF node may result in a constraint node influencing a pool node, and a pool node may result in a constraint node influencing a PSCF node. One preferred selection constraint would be to enforce selection of a connected PSCF node if one of the PSCF nodes connected to the constraint node is activated. In other words, the selection constraint function of the constraint node would be an AND operation. Selection constraints are preferably enforced in response to the selection of at least a first PSCF node that has a connected constraint node. As mentioned above, the nodes are preferably evaluated or propagated in some sequential order. Selection constraints are preferably not enforced on PSCF nodes that have already been selected, but instead are enforced on the selection by a pool node. In some scenarios, a pool node may have the set of possible PSCF nodes reduced to one node after a selection constraint has been enforced and transmitted through a constraint node to a pool member. In other scenarios, a pool node may have the number of possible PSCF nodes reduced or even the probabilistic weighting for selection changed. A constraint node is shown as a connection between two PSCF nodes, but the constraints may alternatively be operatively implemented through a message passing mechanism between pool members and/or sub-networks. The messages preferably modify the operation of selection functions to in effect enforce the constraint nodes as have been described herein. The constraint nodes can be lateral constraints, external constraints, temporal constraints, and/or any suitable type of constraint. The lateral constraints are preferably enforced between two different pools. External constraints are preferably enforced between two different sub-networks. Lateral constraints and external constraints are preferably used for spatial constraints but may be used to define any suitable invariant patterns. Temporal constraints are enforced network evaluation for different instances of time. The temporal constraints can define invariant patterns across different time frames. The temporal selection constraint will determine features that can, may, or cannot happen within a sequence of features. Compiling the final child features of the network into a generated output functions to assemble features into a generated product, representation, or analysis, simulation or any suitable output. The final child features are preferably the child feature nodes of the lowest layer of the hierarchical network. The child feature nodes preferably represent a binomial variable that is representative of the presence of particular data features. A database or mapping may be maintained that maps child feature nodes to particular data features. Compiling the final child features preferably includes mapping selected child feature nodes to data features, which are then compiled into a generated output. The activated child feature nodes are preferably components that, when combined, form a reproduction of a media. For example, if the network was trained or created for image generation, the output is preferably a substantially complete simulated image. If the network was trained with audio features, the final child features can be assembled to output an audio file or signal. When multiple network evaluations are used for a temporal signal, the final child features of a plurality of networks can be compiled into a final generated output.

The method 100 may include performing Steps S130 and S140 at any time and any location of an LBD, preferably according to the transformation configuration of Step S120. For example, an LBD may perform a series of partial forward and reverse transformations, as shown in FIG. 8. As another example, an LBD may obtain image input for half an image. The half image input is entered into the child features. Then the LBD is prompted generate possibilities for the other half.

Step S150, which includes outputting transformed evidence data, functions to output data explanations generated by the LBD. Outputting transformed evidence data preferably includes post-processing the output, but may additionally or alternatively include outputting unprocessed output data. For example, output data may include a set of classification tags for an image, post-processed from a probability distribution across classification tags. As another example, S150 may include outputting a natural-language description of objects within a photograph.

The methods of the preferred embodiment and variations thereof can be embodied and/or implemented at least in part as a machine configured to receive a computer-readable medium storing computer-readable instructions. The instructions are preferably executed by computer-executable components preferably integrated with a recursive cortical network. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method for generating descriptions of a dataset in a bi-directional layer-based network, wherein the network comprises a first layer having a plurality of subnetworks, and a second layer that receives outputs of the plurality of subnetworks, the method comprising:
   receiving the dataset, wherein the dataset has detectable features;
   setting a transformation configuration that directs messaging of data of the dataset and transformed data between the layers of the network;
   at the first layer of the network, performing, by each subnetwork of the plurality of subnetworks, a respective first forward transformation of the dataset into a first set of transformed data including calculating a first posterior probability distribution based on the dataset and a respective set of prior probabilities and likelihood relationships of the detectable features encoded in the first layer of the network, and generating the first set of transformed data from the first posterior probability distribution;
   at the second layer of the network, receiving the first set of transformed data from the first layer of the network;
   at the second layer of the network, performing a first reverse transformation on the first set of transformed data and providing, to each respective subnetwork, data representing an output generated by one or more neighboring subnetworks of the subnetwork;
   at the first layer of the network, generating, by each subnetwork of the first layer, respective sets of updated likelihoods based on received data representing one or more outputs generated by neighboring subnetworks of the subnetwork and a respective set of prior probabilities and likelihood relationships of the detectable features encoded in the first layer of the network;
   at the first layer of the network, performing a second forward transformation of the dataset based on the updated likelihoods to generate a second set of transformed data; and
   at the second layer of the network, performing a third forward transformation of the second set of transformed data to generate an output comprising one or more descriptions of the detectable features of the dataset.

2. The method of claim 1, wherein the dataset comprises at least one of image data, video data, audio data, natural language text data, or sensor data.

3. The method of claim 2, wherein the bi-directional layer-based network is a recursive cortical network.

4. The method of claim 1, wherein performing the third forward transformation comprises:
   receiving the second set of transformed data at one or more inputs of the second layer;
   calculating a second posterior probability distribution based on the first set of transformed data, the set of updated likelihoods of the second set of transformed data, and the set of prior probabilities and likelihood relationships encoded in the second layer; and
   generating a fourth set of transformed data from the second posterior probability distribution at an output of the second layer.

5. The method of claim 1, wherein the bi-directional layer-based network is a recursive cortical network comprising a set of evidence data.

6. The method of claim 5, wherein the recursive cortical network is implemented by a distributed computing system.

7. The method of claim 6, wherein the recursive cortical network comprises:
   a recursively architected network of sub-networks organized into a plurality of hierarchical layers, wherein:
   the sub-networks comprise at least a parent feature node, a pool node, a parent-specific child feature (PSCF) node, and a child feature node;
   a parent feature node of at least one sub-network is configured with a selection function actionable on at least two pool nodes connected to the parent feature node of the at least onesub-network;
   the pool node of the at least one sub-network is configured with a selection function actionable on at least two PSCF nodes connected to the pool node of the at least one sub-network;
   the PSCF node of the at least one sub-network is configured to activate a connected child feature node;
   the child feature node is connectable to at least a parent feature node of a second sub-network at a lower hierarchical layer; and
   a constraint node has at least two connections from the at least twoPSCF nodes and a selection function to augment selection by the pool node.

8. The method of claim 5, wherein the set of evidence data comprises image data.

9. The method of claim 8, wherein the image data comprises image data processed by an edge detection filter.

10. The method of claim 9, wherein the image data is captured by a camera; and wherein outputting the description of the dataset comprises outputting image description data.

11. The method of claim 1, further comprising performing additional forward and reverse transformations based on a static transformation configuration.

12. The method of claim 1, further comprising performing additional forward and reverse transformations based on a dynamic transformation configuration, wherein the dynamic transformation configuration directs messaging based on layer output probability thresholds of the dynamic transformation configuration.

13. The method of claim 1, further comprising performing additional forward and reverse transformations based on a dynamic transform configuration, wherein the dynamic transform configuration directs messaging based on recursion level thresholds of the dynamic transform configuration.

14. The method of claim 1, further comprising performing forward transformations based on lateral constraints encoded in the network.

15. The method of claim 14, wherein performing forward transformations based on lateral constraints comprises enforcing an activation constraint between at least two nodes of the network.

16. The method of claim 1, wherein outputting the description of the dataset comprises outputting a set of data classifiers.

17. A system comprising: one or more computers and one or more storage devices storing instructions that are operable, when executed by the one or more computers, to cause the one or more computers to perform operations comprising:
obtaining a dataset for a bi-directional layer-based network, wherein the network comprises a first layer having a plurality of subnetworks, and a second layer that receives outputs of the plurality of subnetworks, wherein the dataset has detectable features;
setting a transformation configuration that directs messaging of data of the dataset and transformed data between the layers of the network;
at the first layer of the network, performing, by each subnetwork of the plurality of subnetworks, a respective first forward transformation of the dataset into a first set of transformed data including calculating a first posterior probability distribution based on the dataset and a respective set of prior probabilities and likelihood relationships of the detectable features encoded in the first layer of the network, and generating the first set of transformed data from the first posterior probability distribution;
at the second layer of the network, receiving the first set of transformed data from the first layer of the network;
at the second layer of the network, performing a first reverse transformation on the first set of transformed data and providing, to each respective subnetwork, data representing an output generated by one or more neighboring subnetworks of the subnetwork;
at the first layer of the network, generating, by each subnetwork of the first layer, respective sets of updated likelihoods based on received data representing one or more outputs generated by neighboring subnetworks of the subnetwork and a respective set of prior probabilities and likelihood relationships of the detectable features encoded in the first layer of the network;
at the first layer of the network, performing a second forward transformation of the dataset based on the updated likelihoods to generate a second set of transformed data; and
at the second layer of the network, performing a third forward transformation of the second set of transformed data to generate an output comprising one or more descriptions of the detectable features of the dataset.

18. The system of claim 17, wherein the data set comprises at least one of image data, video data, audio data, natural language text data, or sensor data.

19. The system of claim 18, wherein the bi-directional layer-based network is a recursive cortical network.

20. One or more non-transitory computer storage media encoded with computer program instructions that when executed by one or more computers cause the one or more computers to perform operations comprising:
obtaining a dataset for a bi-directional layer-based network, wherein the network comprises a first layer having a plurality of subnetworks, and a second layer that receives outputs of the plurality of subnetworks, wherein the dataset has detectable features;
setting a transformation configuration that directs messaging of data of the dataset and transformed data between the layers of the network;
at the first layer of the network, performing, by each subnetwork of the plurality of subnetworks, a respective first forward transformation of the dataset into a first set of transformed data including calculating a first posterior probability distribution based on the dataset and a respective set of prior probabilities and likelihood relationships of the detectable features encoded in the first layer of the network, and generating the first set of transformed data from the first posterior probability distribution;
at the second layer of the network, receiving the first set of transformed data from the first layer of the network;
at the second layer of the network, performing a first reverse transformation on the first set of transformed data and providing, to each respective subnetwork, data representing an output generated by one or more neighboring subnetworks of the subnetwork;
at the first layer of the network, updating, by each subnetwork of the first layer, respective sets of updated likelihoods based on received data representing one or more outputs generated by neighboring subnetworks of the subnetwork and a respective set of prior probabilities and likelihood relationships of the detectable features encoded in the first layer of the network;
at the first layer of the network, performing a second forward transformation of the dataset based on the updated weights to generate a second set of transformed data; and
at the second layer of the network, performing a third forward transformation of the second set of transformed data to generate an output comprising one or more descriptions of the detectable features of the dataset.

21. The one or more non-transitory computer storage media of claim 20, wherein the data set comprises at least one of image data, video data, audio data, natural language text data, or sensor data.

22. The one or more non-transitory computer storage media of claim 21, wherein the bi-directional layer-based network is a recursive cortical network.

* * * * *